United States Patent
Zou et al.

(10) Patent No.: US 7,947,617 B2
(45) Date of Patent: May 24, 2011

(54) OPTICAL GLASS, PRECISION-PRESSMOLDING PREFORM AND OPTICAL ELEMENT

(75) Inventors: Xuelu Zou, Tokyo (JP); Yasuhiro Fujiwara, Tokyo (JP); Yoshio Nojima, Tokyo (JP)

(73) Assignee: Hoya Corporation, Tokyo (JP)

( * ) Notice: Subject to any disclaimer, the term of this patent is extended or adjusted under 35 U.S.C. 154(b) by 233 days.

(21) Appl. No.: 12/186,071

(22) Filed: Aug. 5, 2008

(65) Prior Publication Data

US 2009/0042711 A1 Feb. 12, 2009

(30) Foreign Application Priority Data

Aug. 10, 2007 (JP) ................. 2007-209018

(51) Int. Cl.
- *C03C 3/064* (2006.01)
- *C03C 3/19* (2006.01)
- *C03C 3/145* (2006.01)
- *C03B 11/00* (2006.01)

(52) U.S. Cl. .................. 501/77; 501/49; 65/63; 65/64

(58) Field of Classification Search .................. 501/65, 501/66, 67, 77, 78, 41, 49, 50, 51, 52; 65/63, 65/64

See application file for complete search history.

(56) References Cited

U.S. PATENT DOCUMENTS

| 7,098,158 B2 * | 8/2006 | Natsugari et al. ................. 501/78 |
| 7,524,781 B2 * | 4/2009 | Nagashima et al. ............. 501/50 |
| 2005/0202952 A1 * | 9/2005 | Fujiwara et al. ................. 501/77 |
| 2006/0079390 A1 * | 4/2006 | Kasuga et al. ................... 501/78 |
| 2008/0096752 A1 * | 4/2008 | Nagaoka .......................... 501/42 |
| 2009/0069166 A1 * | 3/2009 | Fu ................................... 501/42 |

FOREIGN PATENT DOCUMENTS

| WO | WO 2004113244 A1 * | 12/2004 |
| WO | WO 2006118326 A1 * | 11/2006 |

* cited by examiner

*Primary Examiner* — Karl E Group
*Assistant Examiner* — Elizabeth A Bolden
(74) *Attorney, Agent, or Firm* — Nixon & Vanderhye P.C.

(57) ABSTRACT

To provide a high-refractivity high-dispersion optical glass having excellent stability An optical glass which is formed of an oxide glass containing 30 to 70 cationic % of $Bi^{3+}$ and has a liquidus temperature of 800° C. or lower.

57 Claims, 1 Drawing Sheet

[Fig.1]
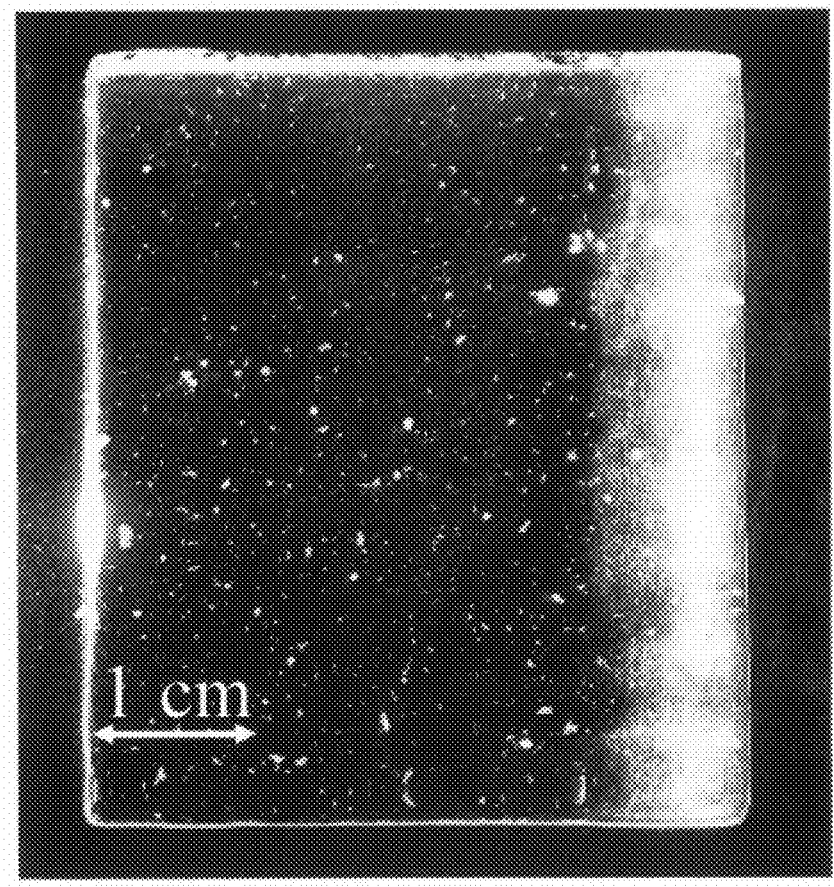
Comparative Example 1 (Sample after Casting)

OPTICAL GLASS, PRECISION-PRESSMOLDING PREFORM AND OPTICAL ELEMENT

TECHNICAL FIELD

This invention relates to an optical glass, and a precision press-molding preform and an optical element which are formed of said optical glass. Further, this invention also relates to a process for the production of the above precision press-molding preform and a process for the production of the above optical element.

BACKGROUND ART

Of optical glasses for producing optical elements such as a lens, etc., a high-refractivity high-dispersion glass is of high utility and occupies an important place. Examples of such a high-refractivity high-dispersion glass include glasses disclosed in Patent Documents 1 to 3. These glasses contain a large amount of $Bi_2O_3$ for attaining high-refractivity high-dispersion properties.
[Patent Document 1] JP2002-201039A
[Patent Document 2] JP2006-327926A
[Patent Document 3] JP2007-70156A

DISCLOSURE OF THE INVENTION

Problems to be Solved by the Invention

Meanwhile, when a glass containing a large amount of $Bi_2O_3$ is melted or molded, it has a problem that when a molten glass thereof has a high temperature, it corrodes a molten glass accumulation vessel, a molten glass stirrer, a molten glass conduit pipe, etc., which are made of metal materials such as platinum, etc. As a result, there is involved a problem that the vessel, the stirrer and the pipe are intensely worn out or that a corroded metal material is included as foreign matter in the glass. In particular, when platinum is corroded, there are caused problems that platinum grains are included as foreign matter in the glass and moreover that platinum ion is dissolved in the glass to color the glass. When the vessel or the pipe is formed of gold which has lower heat resistance than platinum, the vessel is less corroded, but the vessel and the pipe are melted when the temperature during melting is increased to excess. Further, when a non-metallic vessel such as an $SiO_2$ crucible or alumina crucible is used, there is caused a problem that since $SiO_2$ is corroded and dissolved in the glass, the refractive index of the glass is lower than a desired value or that the glass has an increased glass transition temperature.

For overcoming the above situation, it is desirable to keep low the temperature of a molten glass that is flowing out. However, when a glass has a high liquidus temperature and has no sufficient stability, it has a problem that when the temperature of the glass that is flowing out is decreased, a crystal precipitates to devitrify the glass.

Further, when the temperature of a molten glass is high, not only the above problems occur, but also the volatilization amount of volatile components such as $B_2O_3$, alkali metal components, etc., increases to vary optical properties such as a refractive index, Abbe's number, etc., or to cause striae.

Further, in a method (called "hot shaping method") in which a preform made of a glass to be used for producing an optical element by precision press-molding is produced by separating a molten glass gob from a molten glass and directly shaping the molten glass gob into the preform, the glass gob is shaped in a floated state by applying gas pressure to the glass. Therefore, when a molten glass that is flowing out has a high temperature, the glass has a low viscosity at the time when the shaping is started, and the above floating is difficult, so that the hot shaping is no longer possible.

It is a first object of this invention to provide a high-refractivity high-dispersion optical glass excellent in stability by overcoming the above problems.

It is a second object of this invention to provide a precision press-molding preform formed of the above optical glass, an optical element, a process for the production of the precision press-molding preform and a process for the production of the optical element.

Means to Solve the Problems

This invention for achieving the above first and second objects includes the following (1) to (40).

(1) An optical glass formed of an oxide glass comprising, by cationic %, 30 to 70% of $Bi^{3+}$ and having a liquidus temperature of 800° C. or lower.

(2) An optical glass as recited in the above (1), which has a $\lambda_{70}$ of 590 nm or shorter, the $\lambda_{70}$ being a wavelength at which the glass exhibits a spectral transmittance of 70%.

(3) An optical glass as recited in the above (1) or (2), which has a viscosity of 2 dPa·s or more at its liquidus temperature.

(4) An optical glass as recited in any one of the above (1) to (3), which further comprises, by cationic %, 5 to 50% of $B^{3+}$, 0.5 to 50% of $Si^{4+}$ and 1 to 20% of $Al^{3+}$.

(5) An optical glass as recited in any one of the above (1) to (4), wherein the total content of $Bi^{3+}$, $B^{3+}$, $Si^{4+}$ and $Al^{3+}$ by cationic % is 96% or more and the content $Ga^{3+}$ is 0 to 2%.

(6) An optical glass as recited in any one of the above (1) to (4), which further comprises, by cationic %, 0.5 to 20% of $Ca^{2+}$, 0 to 15% of $Mg^{2+}$ and 0 to 10% of $Sr^{2+}$, has, by cationic %, a $Ca^{2+}$, $Mg^{2+}$ and $Sr^{2+}$ total content ($Ca^{2+}+Mg^{2+}+Sr^{2+}$) of 1 to 20% and has an $Al^{3+}/(Ca^{2+}+Mg^{2+}+Sr^{2+})$ ratio of from 0.2 to 20 by cationic ratio.

(7) An optical glass as recited in any one of the above (1) to (4) and (6), which further comprises, by cationic %, 0 to 20% of $Li^+$, 0 to 15% of $Na^+$, 0 to 10% of $K^+$ and 0 to 2% of $Ga^{3+}$, has, by cationic %, an $Li^+$, $Na^+$ and $K^+$ total content of 0 to 20% and a $Ba^{2+}$ and $Zn^{2+}$ total content of 0 to 10% and has an $Al^{3+}/Si^{4+}$ ratio of 0.2 or more by cationic ratio.

(8) An optical glass as recited in any one of the above (1) to (4), (6) and (7), which further comprises, by cationic %, 0 to 8% of $La^{3+}$, 0 to 8% of $Gd^{3+}$ and 0 to 8% of $Y^{3+}$ and has, by cationic %, an $La^{3+}$, $Gd^{3+}$ and $Y^{3+}$ total content of 0.1 to 8%.

(9) An optical glass as recited in any one of the above (1) to (4) and (6) to (8), which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

(10) An optical glass as recited in any one of the above (1) to (9), which has a refractive index (nd) of 1.84 or more and an Abbe's number (vd) of 30 or less.

(11) An optical glass as recited in any one of the above (1) to (10), which has a glass transition temperature (Tg) of 500° C. or lower.

(12) An optical glass which comprises, by cationic %, 30 to 70% of $Bi^{3+}$, 5 to 50% of $B^{3+}$, 0.5 to 50% of $Si^{4+}$, 1 to 20% of $Al^{3+}$, 0.5 to 20% of $Ca^{2+}$, 0 to 15% of $Mg^{2+}$ and 0 to 10% of $Sr^{2+}$, has, by cationic %, a $Ca^{2+}$, $Mg^{2+}$ and $Sr^{2+}$ total content of 1 to 20% and has an $Al^{3+}/(Ca^{2+}+Mg^{2+}+Sr^{2+})$ ratio of from 0.2 to 20 by cationic ratio.

(13) An optical glass as recited in the above (12), which further comprises, by cationic %, 0 to 20% of $Li^+$, 0 to 15% of $Na^+$ and 0 to 10% of $K^+$ and has, by cationic %, an $Li^+$, $Na^+$ and $K^+$ total content of 0 to 20%.

(14) An optical glass as recited in the above (12) or (13), which further comprises, by cationic %, 0 to 8% of $La^{3+}$, 0 to 8% of $Gd^{3+}$ and 0 to 8% of $Y^{3+}$ and has, by cationic %, an $La^{3+}$, $Gd^{3+}$ and $Y^{3+}$ total content of 0.1 to 8%.

(15) An optical glass as recited in any one of the above (12) to (14), which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

(16) An optical glass as recited in any one of the above (12) to (15), which has a liquidus temperature of 800° C. or lower.

(17) An optical glass as recited in any one of the above (12) to (16), which has a $\lambda_{70}$ of 590 nm or shorter, the $\lambda_{70}$ being a wavelength at which the glass exhibits a spectral transmittance of 70%.

(18) An optical glass as recited in any one of the above (12) to (17), which has a viscosity of 2 dPa·s or more at its liquidus temperature.

(19) An optical glass as recited in any one of the above (12) to (16), which has a refractive index (nd) of 1.84 or more and an Abbe's number (vd) of 30 or less.

(20) An optical glass as recited in any one of the above (12) to (19), which has a glass transition temperature (Tg) of 500° C. or lower.

(21) An optical glass which comprises, by cationic %, 30 to 70% of $Bi^{3+}$, 5 to 50% of $B^{3+}$, 0.5 to 50% of $S^{4+}$, 1 to 20% of $Al^{3+}$, 0 to 20% of $Li^+$, 0 to 15% of $Na^+$, 0 to 10% of $K^+$ and 0 to 2% of $Ga^{3+}$, has, by cationic %, an $Li^+$, $Na^+$ and $K^+$ total content of 0 to 20% and a $Ba^{2+}$ and $Zn^{2+}$ total content of 0 to 10% and has an $Al^{3+}/Si^{4+}$ ratio of 0.2 or more by cationic ratio.

(22) An optical glass as recited in the above (21), which further comprises, by cationic %, 0 to 8% of $La^{3+}$, 0 to 8% of $Gd^{3+}$ and 0 to 8% of $Y^{3+}$ and has, by cationic %, an $La^{3+}$, $Gd^{3+}$ and $Y^{3+}$ total content of 0.1 to 8%.

(23) An optical glass as recited in the above (21) or (22), which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

(24) An optical glass as recited in any one of the above (21) to (23), which has a liquidus temperature of 800° C. or lower.

(25) An optical glass as recited in any one of the above (21) to (24), which has a $\lambda_{70}$ of 590 nm or shorter, the $\lambda_{70}$ being a wavelength at which the glass exhibits a spectral transmittance of 70%.

(26) An optical glass as recited in any one of the above (21) to (25), which has a viscosity of 2 dPa·s or more at its liquidus temperature.

(27) An optical glass as recited in any one of the above (21) to (26), which has a refractive index (nd) of 1.84 or more and an Abbe's number (vd) of 30 or less.

(28) An optical glass as recited in any one of the above (21) to (27), which has a glass transition temperature (Tg) of 500° C. or lower.

(29) An optical glass comprising, by cationic %, 30 to 70% of $Bi^{3+}$, 5 to 50% of $B^{3+}$, 0.5 to 50% of $Si^{4+}$, 1 to 20% of $Al^{3+}$ and 0 to 2% of $Ga^{3+}$ and has, by cationic %, a $Bi^{3+}$, $B^{3+}$, $Si^{4+}$ and $Al^{3+}$ total content of 96% or more.

(30) An optical glass as recited in the above (29), which has a liquidus temperature of 800° C. or lower.

(31) An optical glass as recited in the above (29) or (30), which has a $\lambda_{70}$ of 590 nm or shorter, the $\lambda_{70}$ being a wavelength at which the glass exhibits a spectral transmittance of 70%.

(32) An optical glass as recited in any one of the above (29) to (31), which has a viscosity of 2 dPa·s or more at its liquidus temperature.

(33) An optical glass as recited in any one of the above (20) to (32), which has a refractive index (nd) of 1.84 or more and an Abbe's number (vd) of 30 or less.

(34) An optical glass as recited in any one of the above (29) to (33), which has a glass transition temperature (Tg) of 500° C. or lower.

(35) A precision press-molding preform formed of the optical glass recited in any one of the above (1) to (34).

(36) A process for the production of a precision press-molding preform, which comprises causing a molten glass obtained by melting glass raw materials to flow out, separating a molten glass gob from said molten glass and shaping said glass gob into the precision press-molding preform formed of the optical glass recited in any one of the above (1) to (34) in the process of said glass gob being cooled to solidness.

(37) An optical element formed of the optical glass recited in any one of the above (1) to (34).

(38) A process for the production of an optical element, which comprises heating the precision press-molding preform recited in the above (35) or a precision press-molding preform produced by the process recited in the above (36) and precision press-molding the precision press-molding preform with a press mold.

(39) A process for the production of an optical element as recited in the above (38), wherein the preform is introduced into the press mold, and the preform and the press mold are heated together to carry out the precision press-molding.

(40) A process for the production of an optical element as recited in the above (38), wherein said preform is pre-heated and introduced into the press mold to carry out the precision press-molding.

Effect of the Invention

According to this invention, there can be provided a high-refractivity high-dispersion optical glass that is excellent in stability.

According to this invention, further, there can be also provided a precision press-molding preform and an optical element formed of the above optical glass each and processes for the production of them.

BEST MODES FOR PRACTICING THE INVENTION

Optical Glass 1

First, the optical glasses (to be referred to as "optical glass I" hereinafter) according to the first aspect of this invention described in the above (1) to (11) will be explained.

The optical glass I is formed of an oxide glass comprising, by cationic %, 30 to 70% of $Bi^{3+}$ and having a liquidus temperature of 80° C. or lower.

As described in Background Art, a conventional optical glass containing a large amount of $B_2O_3$ for attaining high-refractivity high-dispersion properties has a problem that it corrodes a glass melting vessel, a stirrer, a pipe, etc., and eventually comes to contain foreign mater generated by the corrosion. When the temperature for melting the glass and the temperature at which the glass is caused to flow out are so decreased as to be lower than its liquidus temperature for overcoming the above problem, the glass is devitrified. The present inventors could provide an optical glass I that is formed of an oxide glass comprising, by cationic %, 30 to 70% of $Bi^{3+}$ but has a liquidus temperature of 800° C. or lower and that is excellent in stability.

The optical glass I has a liquidus temperature of 800° C. or lower, and the temperature for melting the glass and the temperature at which the glass is caused to flow out can be decreased, so that it can prevent the above corrosion of a glass melting vessel, a stirrer, a pipe, etc., and the inclusion of foreign matter generated by the corrosion in the glass. Further, the optical glass I can produce an effect that it decreases the above-described dissolved platinum ion, etc., in the glass, which cause the coloring, and the above-described dissolved $SiO_2$, alumina, etc., from those constituting the vessel, etc., in the glass, which causes a decrease in refractivity and an increase in glass transition temperature. Further, when a volatile component such as $B^{3+}$ is contained, the volatilization of such a volatile component is suppressed during melting or molding, and hence the optical glass I can be stably imparted with optical properties such as a refractive index and an Abbe's number.

Since the optical glass I has a low liquidus temperature of 800° C. or lower, a precision press-molding preform can be advantageously produced, while this point will be described later.

The optical glass I has a liquidus temperature of 800° C. or lower, while the liquidus temperature is preferably 780° C. or lower, more preferably 760° C. or lower, particularly preferably 740° C. or lower. There is no special limitation to be imposed on the lower limit of the liquidus temperature. For materializing desired optical properties and glass transition temperature, however, the lower limit thereof is desirably approximately 550° C. or higher.

Although having a large content of $Bi^{3+}$, the optical glass I is less colored, and the wavelength ($\lambda_{70}$) at which it exhibits a spectral transmittance of 70% is preferably 590 nm or shorter, more preferably 570 nm or shorter, still more preferably 550 nm or shorter, particularly preferably 540 nm or shorter.

The optical glass I preferably has a viscosity of 2 dPa·s or more at its liquidus temperature. Owing to the viscosity of 2 dPa·s or more that the optical glass I has at its liquidus temperature, the occurrence of internal striae can be decreased or inhibited when a molten glass is continuously cast into a casting mold to shape glass shaped materials. Further, a preform can be formed by a float-shaping method to be described later.

The optical glass I preferably has a viscosity of 2 dPa·s or more at its liquidus temperature, while the viscosity thereof at its liquidus temperature is more preferably 3 dPa·s or more, still more preferably 4 dPa·s or more, particularly preferably 6 dPa·s or more. While there is no limitation to be imposed on the upper limit of the viscosity, it is 30 dPa·s or less as a general criterion.

The optical glass I has high-refractivity high-dispersion properties. Specifically, the refractive index (nd) thereof is preferably 1.84 or more, more preferably 1.90 or more, still more preferably 1.95 or more, and the Abbe's number (vd) thereof is preferably 30 or less, more preferably 27.5 or less, still more preferably 25 or less. There is no limitation to be imposed on the upper limit of the refractive index, while it is preferably adjusted to 2.2 or less for keeping both the liquidus temperature and the glass transition temperature at low levels. There is no limitation to be imposed on the lower limit of the Abbe's number, while it is preferably adjusted to 10 or more for keeping both the liquidus temperature and the glass transition temperature at low levels.

The optical glass I has the property of being softened at a low temperature, and specifically, the glass more preferably 480° C. or lower, still more preferably 460° C. or lower, yet more preferably 440° C. or lower, most preferably 420° C. or lower. The lower limit of the glass transition temperature is not specially limited, while the lower limit of the glass transition temperature is preferably adjusted to 300° C. for maintaining the above refractive index, Abbe's number and liquidus temperature. Having the above low glass transition temperature, the optical glass I is suitable for the field of use where a glass material is heated and press-molded to produce a glass molded product. When the glass transition temperature is low, press-molding can be carried out at a relatively low heating temperature, so that the deterioration and abrasion of a press mold, etc., can be decreased or prevented. In particular, the optical glass I is suitable for the field of use where molding is repeated many times with keeping the molding surface of a press mold highly accurate like precision press-molding.

The optical glass I is also excellent in weather resistance. The weather resistance of a glass can be represented by using a haze value as an index. The haze value refers to a percentage representation of a ratio of the intensity of scattered light to the intensity of total transmitted light when white light is transmitted through a flat glass plate having optically polished surfaces perpendicular to the polished surfaces, that is, "scattered light intensity/transmitted light intensity". The optical glass I preferably has a haze value of 10 or less, more preferably a haze value of 6 or less, still more preferably a haze value of 4 or less, most preferably a haze value of 0.1 to 3. A glass having a large haze value is a so-called chemically low-durability glass, which may be corroded in high velocity or generate reaction products on the glass surface in high velocity due to water drops or vapors adhering to the glass and various chemical components such as glass components in a use environment. When such a glass is used as an optical element, foreign matter may occur on the surface of an optical glass element because of the corrosion of the glass or reaction products generated on the glass surface, and the optical element may be degraded in optical properties such as a transmittance, etc., so that such a glass is undesirable as an optical glass composition. In particular, when a precision press-molding preform is produced, an altered layer formed on the surface has a detrimental effect on the precision press-molding, and it is hence required to give full attention to the weather resistance of a glass when it is to be applied to the above use. The optical glass I is free of the above problem since its haze value is small.

The composition of the optical glass I will be explained below. Contents of components by % stand for contents of components by cationic % hereinafter.

$Bi^{3+}$ is a component that works to increase both the refractivity and the dispersion. When it is introduced to excess, however, it decreases the stability and precipitates as a colloid in the glass to form a source that causes the scattering of light. The content of $Bi^{3+}$ is hence limited to 30 to 70%. The content of $Bi^{3+}$ is preferably in the range of 32 to 65%, more preferably in the range of 35 to 60%, still more preferably in the range of 37 to 57%, yet more preferably in the range of 40 to 55%.

Preferably, the optical glass I further contains, by cationic %, 5 to 50% of $B^{3+}$, 0.5 to 50% of $Si^{4+}$ and 1 to 20% of $Al^{3+}$ together with $Bi^{3+}$.

$B^{3+}$ works as a network former, and it not only works to improve the glass in stability but also works to improve the glass in meltability. When it is introduced to excess, however, it decreases the refractivity, so that it is preferred to limit the content of $B^{3+}$ to 5 to 50%. The content of $B^{3+}$ is more preferably in the range of 7.5 to 50%, still more preferably in the range of 10 to 50%, yet more preferably in the range of 12.5 to 45%, further preferably in the range of 15 to 45%.

$Si^{4+}$ also works as a network former, and it not only works to improve the glass in stability but also works to improve the glass in chemical durability. When it is introduced to excess, however, the refractivity and meltability are decreased, and the glass transition temperature is increased, so that it is preferred to limit the content of $Si^{4+}$ to 0.5 to 50%. The content of $Si^{4+}$ is more preferably in the range of 1 to 40%, still more preferably in the range of 1 to 30%, yet more preferably 2 to 20%, further more preferably 2 to 15%.

$Al^{3+}$ works not only to improve the glass in stability but also to improve the glass in chemical durability. When it is introduced to excess, however, the stability, refractivity and meltability are decreased, and the glass transition temperature is increased, so that it is preferred to limit the content of $Al^{3+}$ to 1 to 20%. The content of $Al^{3+}$ is more preferably in the range of 1 to 18%, still more preferably in the range of 1 to 16%, yet more preferably in the range of 1 to 15%, further more preferably in the range of 1 to 13%.

The optical glass I can fully maintain the glass stability with these four components alone, and in this case, it is preferred to adjust the total content of $Bi^{3+}$, $B^{3+}$, $Si^{4+}$ and $Al^{3+}$ by cationic % to 96% or more, it is more preferred to adjust the above total content to 97% or more, it is still more preferred to adjust the above total content to 98% or more, and it is further more preferred to adjust the above total content to 99% or more. The above total content can be also adjusted to 100%. When $Ga^{3+}$ is introduced as a balance besides the above four components, the content of $Ga^{3+}$ is adjusted to 0 to 2%. Since $Ga^{3+}$ has a relatively large molecular volume, the glass stability is decreased when it is introduced to a composition containing $Bi^{3+}$, $B^{3+}$, $Si^{4+}$ and $Al^{3+}$ as basic components. Therefore, the content of $Ga^{3+}$ is preferably limited to 0 to 2%, more preferably, to 0 to 1%. Since $Ga^{3+}$ is a component that not only decreases the stability but also is expensive, it is preferred to introduce no $Ga^{3+}$. In this case, a more preferred composition of the optical glass I has content ranges of components similar to those of the glass composition of the optical glass IV to be described later.

The optical glass I may contain alkaline earth metal components in addition to $Bi^{3+}$, $B^{3+}$, $Si^{4+}$ and $Al^{3+}$. In this case, the optical glass I further contains, by cationic %, 0.5 to 20% of $Ca^{2+}$, 0 to 15% of $Mg^{2+}$ and 0 to 10% of $Sr^{2+}$, and it has, by cationic %, a $Ca^{2+}$, $Mg^{2+}$ and $Sr^{2+}$ total content ($Ca^{2+}+Mg^{2+}+Sr^{2+}$) of 1 to 20% and has an $Al^{3+}/(Ca^{2+}+Mg^{2+}+Sr^{2+})$ ratio of from 0.2 to 20 by cationic ratio. $Ca^{2+}$, $Mg^{2+}$ and $Sr^{2+}$ work to remarkably improve the glass stability when they are co-present with $Al^{3+}$. In particular, $Ca^{2+}$ plays the role of a glass former when mixed with $Al^{3+}$, and it greatly contributes to the improvement of stability of the glass containing $Bi^{3+}$ as an essential component. Further, it improves the meltability and works to decrease the glass transition temperature. However, when $Ca^{2+}$, $Mg^{2+}$ and $Sr^{2+}$ are introduced to excess, the stability is rather decreased and the refractivity is also decreased. When these situations are taken into account, the total content ($Ca^{2+}+Mg^{2+}+Sr^{2+}$), the content of each of $Ca^{2+}$, $Mg^{2+}$ and $Sr^{2+}$ and the cationic ratio of $Al^{3+}/(Ca^{2+}+Mg^{2+}+Sr^{2+})$ are limited to the above ranges. In this case, a more preferred composition of the optical glass I has content ranges of components similar to those of the glass composition of the optical glass II to be described later.

The optical glass I may contain alkali metal components in addition to $Bi^{3+}$, $B^{3+}$, $Si^{4+}$ and $Al^{3+}$. In this case, preferably, it contains, by cationic %, 0 to 20% of $Li^+$, 0 to 15% of $Na^+$ and 0 to 10% of $K^+$, and the total content of $Li^+$, $Na^+$ and $K^+$ is 0 to 20%. $Li^+$, $Na^+$ and $K^+$ work to decrease the glass transition temperature and to improve the meltability. When they are introduced to excess, however, they exhibit the tendency to decrease the glass stability and also exhibit the function to decrease the chemical durability. Further, the alkali metal components exhibit volatility at high temperatures and hence volatilize from the glass surface in a high-temperature state, and they hence cause the refractivity and the Abbe's number to vary or cause striae to occur. It is therefore preferred to limit the content of each of $Li^+$, $Na^+$ and $K^+$ and the total content of $Li^+$, $Na^+$ and $K^+$ to the above-specified ranges. In this embodiment, a limitation is imposed on the contents of $Ga^{3+}$, $Ba^{2+}$ and $Zn^{2+}$ for preventing the stability from decreasing. $Ga^{3+}$, $Ba^{2+}$ and $Zn^{2+}$ have relatively large molecular volumes. When a cationic component having the thus-large molecular volume is introduced into a composition containing $Bi^{3+}$, $B^{3+}$, $Si^{4+}$ and $Al^{3+}$ as basic components, the stability is decreased. In this embodiment, therefore, the content of $Ga^{3+}$ is limited to 0 to 2%, preferably, to 0 to 1%. Since $Ga^{3+}$ is a component that not only decreases the stability but also is very expensive, it is preferred to introduce no $Ga^{3+}$. Concerning $Ba^{2+}$ and $Zn^{2+}$, the total content thereof is limited to 0 to 10%. The total content of $Ba^{2+}$ and $Zn^{2+}$ is preferably in the range of 0 to 7%, more preferably in the range of 0 to 5%, still more preferably in the range of 0 to 3%, yet more preferably in the range of 0 to 1%, and further preferably, none of $Ba^{2+}$ and $Zn^{2+}$ are introduced. In this embodiment, the cationic ratio of $Al^{3+}/Si^{4+}$ is limited to 0.2 or more, preferably, to 0.3 or more for maintaining the stability excellently. When the above cationic ratio is less than 0.2, the glass stability is intensely degraded. For maintaining the glass meltability excellently, the cationic ratio of $Al^{3+}/Si^{4+}$ is preferably adjusted to 5 or less, more preferably, to 4.5 or less, still more preferably, to 4 or less. A more preferred composition of the optical glass I in this embodiment has content ranges of components similar to those of the glass composition of the optical glass III to be described later.

The optical glass I may contain $La^{3+}$, $Gd^{3+}$ and $Y^{3+}$ in addition to $Bi^{3+}$, $B^{3+}$, $Si^{4+}$ and $Al^{3+}$. In this case, preferably, the optical glass I contains, by cationic %, 0 to 8% of $La^{3+}$, 0 to 8% of $Gd^{3+}$ and 0 to 8% of $Y^{3+}$, and the total content of $La^{3+}$, $Gd^{3+}$ and $Y^{3+}$ is 0.1 to 8%. $La^{3+}$, $Gd^{3+}$ and $Y^{3+}$ work not only to increase the refractivity but also to improve the chemical durability. When they are introduced to excess, however, the stability is decreased. Preferably, the content of each of $La^{3+}$, $Gd^{3+}$ and $Y^{3+}$ and the total content of $La^{3+}$, $Gd^{3+}$ and $Y^{3+}$ are therefore limited to the above-specified ranges.

In this case, preferably, the optical glass I contains, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

Both $W^{6+}$ and $Ta^{5+}$ work to increase the refractivity. When they are introduced to excess, however, the glass stability is decreased. The contents of them are hence limited to the above-specified ranges.

$Nb^{5+}$, $Zr^{4+}$ and $Ti^{4+}$ work to increase the refractivity, but they work more intensely to increase the glass transition temperature than $Bi^{3+}$. The contents of them are hence limited to the above-specified ranges.

In addition, a more preferred composition of the optical glass I has content ranges of components similar to those of the glass composition of the optical glass III to be described later.

(Optical Glass II)

The optical glasses (to be referred to as "optical glass II" hereinafter) according to the second aspect of this invention described in the above (12) to (20) will be explained below.

The optical glass II comprises, by cationic %, 30 to 70% of $Bi^{3+}$, 5 to 50% of $B^{3+}$, 0.5 to 50% of $Si^{4+}$, 1 to 20% of $Al^{3+}$, 0.5 to 20% of $Ca^{2+}$, 0 to 15% of $Mg^{2+}$ and 0 to 10% of $Sr^{2+}$, and it has, by cationic %, a $Ca^{2+}$, $Mg^{2+}$ and $Sr^{2+}$ total content ($Ca^{2+}$+$Mg^{2+}$+$Sr^{2+}$) of 1 to 20% and has an $Al^{3+}$/($Ca^{2+}$+$Mg^{2+}$+$Sr^{2+}$) ratio of from 0.2 to 20 by cationic ratio.

In the optical glass II, $Bi^{3+}$ is a component that works to increase both the refractivity and the dispersion. When it is introduced to excess, however, it decreases the stability and precipitates as a colloid in the glass to constitute a source that causes the scattering of light. The content of $Bi^{3+}$ is hence limited to 30 to 70%. The content of $Bi^{3+}$ is preferably in the range of 32 to 65%, more preferably in the range of 35 to 60%, still more preferably in the range of 37 to 57%, most preferably in the range of 40 to 55%.

$B^{3+}$ works as a network former, and it not only works to improve the glass in stability but also works to improve the glass in meltability. When it is introduced to excess, however, it decreases the refractivity, so that the content of $B^{3+}$ is limited to 5 to 50%. The content of $B^{3+}$ is preferably in the range of 7.5 to 50%, more preferably in the range of 10 to 50%, still more preferably in the range of 12.5 to 45%, most preferably in the range of 15 to 45%.

$Si^{4+}$ also works as a network former, and it not only works to improve the glass in stability but also works to improve the glass in chemical durability. When it is introduced to excess, however, the refractivity and meltability are decreased, and the glass transition temperature is increased, so that the content of $Si^{4+}$ is limited to 0.5 to 50%. The content of $Si^{4+}$ is preferably in the range of 1 to 40%, more preferably in the range of 1 to 30%, still more preferably 2 to 20%, most preferably 2 to 15%.

$Al^{3+}$ works not only to improve the glass in stability but also to improve the glass in chemical durability. When it is introduced to excess, however, the stability, refractivity and meltability are decreased, and the glass transition temperature is increased, so that the content of $Al^{3+}$ is limited to 1 to 20%. The content of $Al^{3+}$ is preferably in the range of 1 to 18%, more preferably in the range of 1 to 16%, still more preferably in the range of 1 to 15%, most preferably in the range of 1 to 13%.

In the optical glass II, the cationic ratio of $Al^{3+}$/$Si^{4+}$ is preferably limited to 0.2 or more, more preferably, to 0.3 or more for maintaining the stability excellently. When the above cationic ratio is less than 0.2, the glass stability is intensely degraded. For maintaining the glass meltability excellently, the cationic ratio of $Al^{3+}$/$Si^{4+}$ is preferably adjusted to 5 or less, more preferably, to 4.5 or less, still more preferably, to 4 or less.

$Ca^{2+}$, $Mg^{2+}$ and $Sr^{2+}$ work to remarkably improve the glass in stability when they are co-present with $Al^{3+}$. In particular, $Ca^{2+}$ plays the role of a glass former when mixed with $Al^{3+}$, and it greatly contributes to the improvement of stability of the glass containing $Bi^{3+}$ as an essential component. Further, it improves the meltability and also works to decrease the glass transition temperature. However, when $Ca^{2+}$, $Mg^{2+}$ and $Sr^{2+}$ are introduced to excess, the stability is rather decreased and the refractivity is also decreased, so that the total content ($Ca^{2+}$+$Mg^{2+}$+$Sr^{2+}$) is limited to 1 to 20%. The above total content is preferably in the range of 1 to 15%, more preferably in the range of 1 to 12%, still more preferably in the range of 1 to 10%, most preferably in the range of 1 to 7.5%. Further, the optical glass II contains, by cationic %, 0.5 to 20% of $Ca^{2+}$, 0 to 15% of $Mg^{2+}$ and 0 to 10% of $Sr^{2+}$, and more preferably, the content of $Ca^{2+}$ is in the range of 1 to 15%, that of $Mg^{2+}$, 0 to 12%, and that of $Sr^{2+}$, 0 to 10%. Still more preferably, the content of $Ca^{2+}$ is in the range of 1 to 10%, that of $Mg^{2+}$, 0 to 7%, and that of $Sr^{2+}$, 0 to 4%. Most preferably, the content of $Ca^{2+}$ is in the range of 1 to 7%, that of $Mg^{2+}$, 0 to 5%, and that of $Sr^{2+}$, 0 to 2%. Further, the cationic ratio of $Al^{3+}$/($Ca^{2+}$+$Mg^{2+}$+$Sr^{2+}$) is from 0.2 to 20, and it is more preferably in the range of 0.1 to 17, still more preferably in the range of 1 to 12.5, most preferably in the range of 1 to 10.

In the optical glass II, it is desirable to impose the following limitations on the contents of $Ga^{3+}$, $Ba^{2+}$ and $Zn^{2+}$ for keeping the stability from decreasing. $Ga^{3+}$, $Ba^{2+}$ and $Zn^{2+}$ have relatively large molecular volumes. When such cationic components having large molecular volumes are introduced to a composition containing $Bi^{3+}$, $B^{3+}$, $Si^{4+}$ and $Al^{3+}$ as basic components, the stability is decreased. In the optical glass II, therefore, it is preferred to limit the content of $Ga^{3+}$ to 0 to 2%, more preferably, to 0 to 1%. Since $Ga^{3+}$ is a component that not only decreases the stability but also is very expensive, it is still more preferred to introduce no $Ga^{3+}$. Concerning $Ba^{2+}$ and $Zn^{2+}$, the total content of $Ba^{2+}$ and $Zn^{2+}$ is preferably limited to 0 to 10%. This total content is more preferably in the range of 0 to 7%, still more preferably in the range of 0 to 5%, yet more preferably in the range of 0 to 3%, further more preferably in the range of 0 to 1%, and it is the most preferred to introduce none of $Ba^{2+}$ and $Zn^{2+}$.

The optical glass II can further contain $Li^+$, $Na^+$ and $K^+$. Alkali metal components such as $Li^+$, $Na^+$, $K^+$, etc., work to decrease the glass transition temperature and to improve the meltability. When introduced into the optical glass II, however, they tend to decrease the glass stability and also tend to decrease the chemical durability. Further, since the alkali metal components exhibit volatility, they volatilize from a glass surface in a high-temperature state and cause the Abbe's number to vary or cause striae to occur. Therefore, the total content of $Li^+$, $Na^+$ and $K^+$ is preferably 0 to 20%, and the total content thereof is more preferably in the range of 0 to 15%, still more preferably in the range of 0 to 12%, yet more preferably in the range of 0 to 10%, most preferably in the range of 0 to 8%. Further, concerning the content of each component, preferably, the content of $Li^+$ is 0 to 20%, the content of $Na^+$ is 0 to 15% and the content of $K^+$ is 0 to 10%. More preferably, the content of $Li^+$ is in the range of 0 to 15%, that of $Na^+$, 0 to 12%, and that of $K^+$, 0 to 8%. Still more preferably, the content of $Li^+$ is in the range of 0 to 12%, that of $Na^+$, 0 to 10%, and that of $K^+$, 0 to 5%. Yet more preferably, the content of $Li^+$ is in the range of 0 to 10%, that of $Na^+$, 0 to 7%, and that of $K^+$, 0 to 4%. Most preferably, the content of $Li^+$ is in the range of 0 to 7%, that of $Na^+$, 0 to 5%, and that of $K^+$, 0 to 2%.

The optical glass II has a low glass transition temperature and has sufficient meltability even when it contains no alkali metal component, and it hence does not need any alkali metal component. From the viewpoint of further improvements in stability and chemical durability, the stabilization of optical properties and the prevention of striae, it is preferred to introduce none of $Li^+$, $Na^+$ and $K^+$.

The optical glass II can contain $La^{3+}$, $Gd^{3+}$ and $Y^{3+}$. $La^{3+}$, $Gd^{3+}$ and $Y^{3+}$ work not only to increase the refractivity but also to improve the chemical durability. When they are introduced to excess, however, the stability is degraded. Therefore, the content of $La^{3+}$ is preferably limited to 0 to 8%, more preferably, to 0 to 6%, still more preferably, to 0 to 5%, and most preferably, to 0 to 4%. The content of $Gd^{3+}$ is preferably limited to 0 to 8%, more preferably, to 0 to 6%, still more preferably, to 0 to 5%, and most preferably, to 0 to 4%. The content of $Y^{3+}$ is preferably limited to 0 to 8%, more preferably, to 0 to 6%, still more preferably, to 0 to 5%, and most preferably, to 0 to 4%.

$La^{3+}$, $Gd^{3+}$ and $Y^{3+}$ are all optional components, and none of these components may be introduced to the optical glass II. When priority is given to an increase in refractivity and a further improvement in chemical durability, it is preferred to adjust the total content of $La^{3+}$, $Gd^{3+}$ and $Y^{3+}$ to 0.1 to 8%, and this total content is more preferably 0.5 to 6%, still more preferably 1 to 5%, most preferably 1 to 4%.

The optical glass II can contain $W^{6+}$, $Nb^{5+}$, $Zr^{4+}$ and $Ti^{4+}$.

$W^{6+}$ works to increase the refractivity. When it is introduced to excess, however, the glass is degraded in stability. Therefore, the content of $W^{6+}$ is preferably 0 to 8%, more preferably 0 to 5%, most preferably 0 to 3%.

$Ta^{5+}$ also works to increase the refractivity. When it is introduced to excess, however, the glass is degraded in stability. Therefore, the content of $Ta^{5+}$ is preferably 0 to 5%, more preferably 0 to 4%, still more preferably 0 to 3%, yet more preferably 0%.

$Nb^{5+}$, $Zr^{4+}$ and $Ti^{4+}$ work to increase the refractivity, but they work more intensely to increase the glass transition temperature than $Bi^{3+}$. When an attempt is made to increase the refractivity while maintaining the stability by introducing these components and increasing the amounts thereof, an increase in the glass transition temperature is inevitable. Therefore, the content of $Nb^{5+}$ is preferably 0 to 8%, more preferably in the range of 0 to 5%, still more preferably in the range of 0 to 3%, and no introduction thereof is the most preferred. The content of $Zr^{4+}$ is preferably 0 to 8%, more preferably in the range of 0 to 5%, still more preferably in the range of 0 to 3%, and no introduction thereof is the most preferred. The content of $Ti^{4+}$ is preferably 0 to 10%, more preferably in the range of 0 to 9%, still more preferably in the range of 0 to 8%, yet more preferably in the range of 0 to 6%, most preferably in the range of 0 to 4%.

The optical glass II can further contain $Ga^{3+}$, $In^{3+}$, $Ge^{4+}$, $P^{5+}$, $Ce^{4+}$, etc.

However, $Ga^{3+}$, $In^{3+}$ and $Ge^{4+}$ are expensive components, and if the glass has desired qualities and properties as needed without these components, none of these may be introduced.

When introduced to excess, $P^{5+}$ decreases the refractivity, so that the content of $P^{5+}$ is preferably limited to 0 to 3%, more preferably, to 0 to 2%, still more preferably, to 0 to 1%, yet more preferably, to 0%.

$Ce^{4+}$ works to inhibit $Bi^{3+}$ from precipitating as a colloid. When introduced to excess, $Ce^{4+}$ colors the glass. Therefore, the content of $Ce^{4+}$ is preferably limited to 0 to 2%, more preferably, to 0 to 1%. The optical glass II is a glass in which little or no colloid above is precipitated even if $Ce^{4+}$ is not added. $Ce^{4+}$ may degrade the transmittance in some cases when added, and it may deteriorate the molding surface of a press mold to be described later. It is hence still more preferred to introduce no $Ce^{4+}$.

$Pb^{4+}$, $Te^{4+}$, $Cd^{2+}$, $Tl^{+}$ and $Th^{4+}$ increase the refractivity but have toxicity, and it is hence preferred to introduce none of these for decreasing environmental burdens.

Concerning $Pb^{4+}$, when precision press-molding is carried out in a reducing atmosphere, Pb ion in the vicinity of the glass surface is reduced and precipitated as metallic lead, and the metallic lead adheres to a press mold and hampers the precision transfer of a molding surface form to the glass. For preventing this phenomenon, it is also desirable to introduce no Pb into the glass.

As a refiner, $Sb_2O_3$ can be added. The amount of $Sb_2O_3$ on the basis of a glass composition excluding $Sb_2O_3$ is preferably in the range of 0 to 1 mass %, more preferably 0 to 0.5 mass %.

Further, $As_2O_3$ exhibits a strong oxidizing action and greatly deteriorates the molding surface, and for preventing this deterioration, it is desirable to introduce no $As_2O_3$ into the glass.

In the optical glass II, the liquidus temperature thereof is preferably 800° C. or lower, the $\lambda_{70}$ thereof is preferably 590 nm or shorter, and the viscosity thereof at its liquidus temperature is preferably 2 dPa·s or more.

The optical glass II has a liquidus temperature of 800° C. or lower, and the temperature for melting the glass and the temperature at which the glass is caused to flow out can be decreased, so that it can prevent the above corrosion of a glass melting vessel, a stirrer, a pipe, etc., and the inclusion of foreign matter generated by the corrosion in the glass. Further, the optical glass II can also produce an effect that it decreases the above-described dissolved platinum ion, etc., in the glass, which cause the coloring, and the above-described dissolved $SiO_2$, alumina, etc., from those constituting the vessel, etc., in the glass, which causes a decrease in refractivity and an increase in glass transition temperature. Further, even when a volatile component such as $B^{3+}$ is contained, the volatilization of such a volatile component is suppressed during melting or molding, and hence the optical glass II can be stably imparted with optical properties such as a refractive index and an Abbe's number.

Since the optical glass II has a low liquidus temperature of 800° C. or lower, a precision press-molding preform can be advantageously produced therefrom, while this point will be described later.

The liquidus temperature of the optical glass II is preferably 800° C. or lower, more preferably 780° C. or lower, still more preferably 760° C. or lower, particularly preferably 740° C. or lower. Although the lower limit of the liquidus temperature is not specially limited, it is desirably approximately 550° C. or higher for materializing the optical properties and glass transition temperature that are desired.

In spite of a large content of $Bi^{3+}$, the optical glass II is little colored, and its $\lambda_{70}$ is preferably 590 nm or shorter. The $\lambda_{70}$ is more preferably 570 nm or shorter, still more preferably 550 nm or shorter, particularly preferably 540 nm or shorter.

The optical glass II preferably has a viscosity of 2 dPa·s or more at its liquidus temperature. Owing to the viscosity of 2 dPa·s or more that the optical glass II has at its liquidus temperature, the occurrence of internal striae can be decreased or inhibited when a molten glass is continuously cast into a casting mold to shape glass shaped materials. Further, a preform can be formed by a float-shaping method.

The optical glass II preferably has a viscosity of 2 dPa·s or more at its liquidus temperature, while the viscosity thereof at its liquidus temperature is more preferably 3 dPa·s or more, still more preferably 4 dPa·s or more, particularly preferably 6 dPa·s or more. While there is no limitation to be imposed on the upper limit of the viscosity, it is 30 dPa·s or less as a general criterion.

The optical glass II has high-refractivity high-dispersion properties. Specifically, the refractive index nd thereof is preferably 1.84 or more, more preferably 1.90 or more, still more preferably 1.95 or more, and the Abbe's number vd thereof is preferably 30 or less, more preferably 27.5 or less, still more preferably 25 or less. There is no limitation to be imposed on the upper limit of the refractive index, while it is preferably adjusted to 2.2 or less for keeping both the liquidus temperature and the glass transition temperature at low levels. There is no limitation to be imposed on the lower limit of the Abbe's number, while it is preferably adjusted to 10 or more for keeping both the liquidus temperature and the glass transition temperature at low levels.

The optical glass II has the property of being softened at a low temperature, and specifically, the glass transition temperature thereof is preferably 500° C. or lower, more preferably 480° C. or lower, still more preferably 460° C. or lower, yet more preferably 440° C. or lower, most preferably 420° C. or lower. The lower limit of the glass transition temperature is not specially limited, while the lower limit of the glass transition temperature is preferably adjusted to 300° C. for maintaining the above refractive index, Abbe's number and liquidus temperature. Having the above low glass transition temperature, the optical glass II is suitable for the field of use where a glass material is heated and press-molded to produce a glass molded product. When the glass transition temperature is low, press-molding can be carried out at a relatively low heating temperature, so that the deterioration and abrasion of a press mold, etc., can be decreased or prevented. In particular, the optical glass II is suitable for the field of use where molding is repeated many times with keeping the molding surface of a press mold highly accurate like precision press-molding.

The optical glass II is also excellent in weather resistance. The weather resistance of a glass can be represented by using a haze value as an index. The haze value refers to a percentage representation of a ratio of the intensity of scattered light to the intensity of total transmitted light when white light is transmitted through a flat glass plate having optically polished surfaces perpendicular to the polished surfaces, that is, "scattered light intensity/transmitted light intensity". The optical glass II preferably has a haze value of 10 or less, more preferably a haze value of 6 or less, still more preferably a haze value of 4 or less, most preferably a haze value of 0.1 to 3. A glass having a large haze value is a so-called chemically low-durability glass, which may be corroded in high velocity or generate reaction products on the glass surface in high velocity due to water drops or vapors adhering to the glass and various chemical components such as glass components in a use environment. When such a glass is used as an optical element, foreign matter may occur on the surface of an optical glass element because of the corrosion of the glass or products generated on the glass surface, and the optical element may be degraded in optical properties such as a transmittance, etc., so that such a glass is undesirable as an optical glass composition. In particular, when a precision press-molding preform is produced, an altered layer on the surface has a detrimental effect on the precision press-molding, and it is hence required to give full attention to the weather resistance of a glass when it is to be applied to the above use. The optical glass II is free of the above problem since its haze value is small.

(Optical Glass III)

The optical glasses (to be referred to as "optical glass III" hereinafter) according to the third aspect of this invention described in the above (21) to (27) will be explained below.

The optical glass III comprises, by cationic %, 30 to 70% of $Bi^{3+}$, 5 to 50% of $B^{3+}$, 0.5 to 50% of $Si^{4+}$, 1 to 20% of $Al^{3+}$, 0 to 20% of $Li^+$, 0 to 15% of $Na^+$ and 0 to 10% of $K^+$, and it has, by cationic %, an $Li^+$, $Na^+$ and $K^+$ total content of 0 to 20% and a $Ba^{2+}$ and $Zn^{2+}$ total content of 0 to 10% and has an $Al^{3+}/Si^{4+}$ ratio of 0.2 or more by cationic ratio.

In the optical glass III, $Bi^{3+}$ is a component that works to increase both the refractivity and the dispersion. When it is introduced to excess, however, it decreases the stability and precipitates as a colloid in the glass to form a source that causes the scattering of light. The content of $Bi^{3+}$ is hence limited to 30 to 70%. The content of $Bi^{3+}$ is preferably in the range of 32 to 65%, more preferably in the range of 35 to 60%, still more preferably in the range of 37 to 57%, most preferably in the range of 40 to 55%.

$B^{3+}$ works as a network former, and it not only works to improve the glass in stability but also works to improve the glass in meltability. When it is introduced to excess, however, it decreases the refractivity, so that the content of $B^{3+}$ is limited to 5 to 50%. The content of $B^{3+}$ is preferably in the range of 7.5 to 50%, still more preferably in the range of 10 to 50%, yet more preferably in the range of 12.5 to 45%, most preferably in the range of 15 to 45%.

$Si^{4+}$ also works as a network former, and it not only works to improve the glass in stability but also works to improve the glass in chemical durability. When it is introduced to excess, however, the refractivity and meltability are decreased, and the glass transition temperature is increased, so that the content of $Si^{4+}$ is limited to 0.5 to 50%. The content of $Si^{4+}$ is preferably in the range of 1 to 40%, more preferably in the range of 1 to 30%, still more preferably 2 to 20%, most preferably 2 to 15%.

$Al^{3+}$ works not only to improve the glass in stability but also to improve the glass in chemical durability. When it is introduced to excess, however, the stability, refractivity and meltability are decreased, and the glass transition temperature is increased, so that the content of $Al^{3+}$ is limited to 1 to 20%. The content of $Al^{3+}$ is preferably in the range of 1 to 18%, more preferably in the range of 1 to 16%, still more preferably in the range of 1 to 15%, most preferably in the range of 1 to 13%.

In the optical glass III, the cationic ratio of $Al^{3+}/Si^{4+}$ is adjusted to 0.2 or more for maintaining the stability excellently. The above cationic ratio is preferably 0.3 or more. When the above cationic ratio is less than 0.2, the glass stability is extremely degraded. For maintaining the meltability of the glass excellently, the cationic ratio of $Al^{3+}/Si^{4+}$ is preferably adjusted to 4.5 or less, more preferably, to 4 or less.

The optical glass III can further contain $Li^+$, $Na^+$ and $K^+$. Alkali metal components such as $Li^+$, $Na^+$, $K^+$, etc., work to decrease the glass transition temperature and to improve the meltability. When introduced into the optical glass III, however, they tend to decrease the glass stability and also tend to decrease the chemical durability. Further, since the alkali metal components exhibit volatility, they volatilize from a glass surface in a high-temperature state and cause the Abbe's number to vary or cause striae to occur. Therefore, the total content of $Li^+$, $Na^+$ and $K^+$ is preferably 0 to 20%, and the total content thereof is more preferably in the range of 0 to 15%, still more preferably in the range of 0 to 12%, yet more preferably in the range of 0 to 10%, most preferably in the range of 0 to 8%. Further, concerning the content of each component, preferably, the content of $Li^+$ is 0 to 20%, the content of $Na^+$ is 0 to 15% and the content of $K^+$ is 0 to 10%. More preferably, the content of $Li^+$ is in the range of 0 to 15%, that of $Na^+$, 0 to 12%, and that of $K^+$, 0 to 8%. Still more preferably, the content of $Li^+$ is in the range of 0 to 12%, that of $Na^+$, 0 to 10%, and that of $K^+$, 0 to 5%. Yet more preferably, the content of $Li^+$ is in the range of 0 to 10%, that of $Na^+$, 0 to 7%, and that of $K^+$, 0 to 4%. Most preferably, the content of $Li^+$ is in the range of 0 to 7%, that of $Na^+$, 0 to 5%, and that of $K^+$, 0 to 2%.

The optical glass III has a low glass transition temperature and has sufficient meltability even when it contains no alkali metal component, and it hence does not need any alkali metal component as an essential component. From the viewpoint of further improvements in stability and chemical durability, the stabilization of optical properties and the prevention of striae, it is preferred to introduce none of $Li^+$, $Na^+$ and $K^+$.

When the utmost importance is put on a further decrease in the glass transition temperature for the purpose decrease in the glass transition temperature for the purpose of further decreasing the temperature during press-molding such as precision press-molding or the annealing temperature, the total content of $Li^+$, $Na^+$ and $K^+$ within the above total content range is preferably adjusted to 0.5% or more, more preferably to 1% or more.

In the optical glass III containing $Bi^{3+}$, $B^{3+}$, $Si^{4+}$ and $Al^{3+}$ as essential components, when components having large molecular volumes such as $Ga^{3+}$, $Ba^{2+}$ and $Zn^{2+}$ are introduced in large amounts, the glass stability is greatly decreased. For maintaining the stability, therefore, it is preferred to limit the content of $Ga^{3+}$ to the range of 0 to 2%. When it is taken into account that $Ga^{3+}$ is a component that is expensive and decreases the stability, the content of $Ga^{2+}$ is preferably in the range of 0 to 1% and it is more preferred to introduce no $Ga^{3+}$. Concerning $Ba^{2+}$ and $Zn^{2+}$, the total content of $Ba^{2+}$ and $Zn^{2+}$ is limited to 0 to 10%. For maintaining the glass stability, the total content is preferably in the range of 0 to 7%, more preferably in the range of 0 to 5%, still more preferably in the range of 0 to 3%, yet more preferably in the range of 0 to 1%, and it is the most preferred to introduce none of $Ba^{2+}$ and $Zn^{2+}$.

Since $Mg^{2+}$, $Ca^{2+}$ and $Sr^{2+}$ work to remarkably improve the glass in stability when they are co-present with $Al^{3+}$, they may be introduced. In particular, $Ca^{2+}$ plays the role of a glass former when mixed with $Al^{3+}$, and it greatly contributes to the improvement of stability of the glass containing $Bi^{3+}$ as an essential component. Further, it improves the meltability and also works to decrease the glass transition temperature. However, when they are introduced to excess, the stability is rather decreased and the refractivity is also decreased, so that the total content ($Mg^{2+}+Ca^{2+}+Sr^{2+}$) is preferably limited to 0 to 20%. The above total content is more preferably in the range of 0 to 15%, still more preferably in the range of 0 to 12%, yet more preferably in the range of 0 to 10%, further preferably in the range of 0 to 7.5%. Further, the optical glass III % of $Mg^{2+}$ and 0 to 10% of $Sr^{2+}$, and more preferably, the content of $Ca^{2+}$ is in the range of 0 to 15%, that of $Mg^{2+}$, 0 to 12%, and that of $Sr^{2+}$, 0 to 10%. Still more preferably, the content of $Ca^{2+}$ is in the range of 0 to 10%, that of $Mg^{2+}$, 0 to 7%, and that of $Sr^{2+}$, 0 to 4%. Yet more preferably, the content of $Ca^{2+}$ is in the range of 0 to 7%, that of $Mg^{2+}$, 0 to 5%, and that of $Sr^{2+}$, 0 to 2%. Further, when $Mg^{2+}$, $Ca^{2+}$ and $Sr^{2+}$ are introduced in a total content of 1% or more, the cationic ratio of $Al^{3+}/(Ca^{2+}+Mg^{2+}+Sr^{2+})$ is preferably adjusted to 0.2-20, more preferably to 0.1-17, still more preferably to 1-12.5, yet more preferably to 1-10.

The optical glass III can contain $La^{3+}$, $Gd^{3+}$ and $Y^{3+}$. $La^{3+}$, $Gd^{3+}$ and $Y^{3+}$ work not only to increase the refractivity but also to improve the chemical durability. When they are introduced to excess, however, the stability is degraded. Therefore, the content of $La^{3+}$ is preferably limited to 0 to 8%, more preferably, to 0 to 6%, still more preferably, to 0 to 5%, and most preferably, to 0 to 4%. The content of $Gd^{3+}$ is preferably limited to 0 to 8%, more preferably, to 0 to 6%, still more preferably, to 0 to 5%, and most preferably, to 0 to 4%. The content of $Y^{3+}$ is preferably limited to 0 to 8%, more preferably, to 0 to 6%, still more preferably, to 0 to 5%, and most preferably, to 0 to 4%.

$La^{3+}$, $Gd^{3+}$ and $Y^{3+}$ are all optional components, and none of these components may be introduced to the optical glass III. When priority is given to an increase in refractivity and a further improvement in chemical durability, it is preferred to adjust the total content of $La^{3+}$, $Gd^{3+}$ and $Y^{3+}$ to 0.1 to 8%, and this total content is more preferably 0.5 to 6%, still more preferably 1 to 5%, most preferably 1 to 4%.

The optical glass III can contain $W^{6+}$, $Nb^{5+}$, $Zr^{4+}$ and $Ti^{4+}$.

$W^{6+}$ works to increase the refractivity. When it is introduced to excess, however, the glass is degraded in stability. Therefore, the content of $W^{6+}$ is preferably 0 to 8%, more preferably 0 to 5%, most preferably 0 to 3%.

$Ta^{5+}$ also works to increase the refractivity. When it is introduced to excess, however, the glass is degraded in stability. Therefore, the content of $Ta^{5+}$ is preferably 0 to 5%, more preferably 0 to 4%, still more preferably 0 to 3%, yet more preferably 0%.

$Nb^{5+}$, $Zr^{4+}$ and $Ti^{4+}$ work to increase the refractivity, but they work more intensely to increase the glass transition temperature than $Bi^{3+}$. When an attempt is made to increase the refractivity while maintaining the stability by introducing these components and increasing the amounts thereof, an increase in the glass transition temperature is inevitable. Therefore, the content of $Nb^{5+}$ is preferably 0 to 8%, more preferably in the range of 0 to 5%, still more preferably in the range of 0 to 3%, and no introduction thereof is the most preferred. The content of $Zr^{4+}$ is preferably 0 to 8%, more preferably in the range of 0 to 5%, still more preferably in the range of 0 to 3%, and no introduction thereof is the most preferred. The content of $Ti^{4+}$ is preferably 0 to 10%, more preferably in the range of 0 to 9%, still more preferably in the range of 0 to 8%, yet more preferably in the range of 0 to 6%, most preferably in the range of 0 to 4%.

The optical glass III can further contain $Ga^{3+}$, $In^{3+}$, $Ge^{4+}$, $P^{5+}$, $Ce^{4+}$, etc.

However, $Ga^{3+}$, $In^{3+}$ and $Ge^{4+}$ are expensive components, and if the glass has desired qualities and properties as needed without these components, none of these may be introduced.

When introduced to excess, $P^{5+}$ decreases the refractivity, so that the content of $P^{5+}$ is preferably limited to 0 to 3%, more preferably, to 0 to 2%, still more preferably, to 0 to 1%, yet more preferably, to 0%.

$Ce^{4+}$ works to inhibit $Bi^{3+}$ from precipitating as a colloid. When introduced to excess, $Ce^{4+}$ colors the glass. Therefore, the content of $Ce^{4+}$ is preferably limited to 0 to 2%, more preferably, to 0 to 1%. The optical glass III is a glass in which little or no colloid above is precipitated even if $Ce^{4+}$ is not added. $Ce^{4+}$ may degrade the transmittance in some cases when added, and it may deteriorate the molding surface of a press mold to be described later. It is hence still more preferred to introduce no $Ce^{4+}$.

$Pb^{4+}$, $Te^{4+}$, $Cd^{2+}$, $Tl^+$ and $Th^{4+}$ increase the refractivity but have toxicity, and it is hence preferred to introduce none of these for decreasing environmental burdens.

Concerning $Pb^{4+}$, when precision press-molding is carried out in a reducing atmosphere, Pb ion in the vicinity of the glass surface is reduced and precipitated as metallic lead, and the metallic lead adheres to a press mold and hampers the precision transfer of a molding surface form to the glass. For preventing this phenomenon, it is also desirable to introduce no Pb into the glass.

As a refiner, $Sb_2O_3$ can be added. The amount of $Sb_2O_3$ on the basis of a glass composition excluding $Sb_2O_3$ is preferably in the range of 0 to 1 mass %, more preferably 0 to 0.5 mass %.

Further, $As_2O_3$ exhibits a strong oxidizing action and greatly deteriorates the molding surface, and for preventing this deterioration, it is desirable to introduce no $As_2O_3$ into the glass.

In the optical glass III, the liquidus temperature thereof is preferably 800° C. or lower, the $\lambda_{70}$ thereof is preferably 590 nm or shorter, and the viscosity thereof at its liquidus temperature is preferably 2 dPa·s or more.

The optical glass III has a liquidus temperature of 800° C. or lower, and the temperature for melting the glass and the temperature at which the glass is caused to flow out can be decreased, so that it can prevent the above corrosion of a glass melting vessel, a stirrer, a pipe, etc., and the inclusion of foreign matter generated by the corrosion in the glass. Further, the optical glass III can also produce an effect that it decreases the above-described dissolved platinum ion, etc., in the glass, which cause the coloring, and the above-described dissolved $SiO_2$, alumina, etc., from those constituting the vessel, etc., in the glass, which causes a decrease in refractivity and an increase in glass transition temperature. Further, even when a volatile component such as $B^{3+}$ is contained, the volatilization of such a volatile component is suppressed during melting or molding, and hence the optical glass III can be stably imparted with optical properties such as a refractive index and an Abbe's number.

Since the optical glass III has a low liquidus temperature of 800° C. or lower, a precision press-molding preform can be advantageously produced therefrom, while this point will be described later.

The liquidus temperature of the optical glass III is preferably 800° C. or lower, more preferably 780° C. or lower, still more preferably 760° C. or lower, particularly preferably 740° C. or lower. Although the lower limit of the liquidus temperature is not specially limited, it is desirably approximately 550° C. or higher for materializing the optical properties and glass transition temperature that are desired.

In spite of a large content of $Bi^{3+}$, the optical glass III is little colored, and its $\lambda_{70}$ is preferably 590 nm or shorter. The $\lambda_{70}$ is more preferably 570 nm or shorter, still more preferably 550 nm or shorter, particularly preferably 540 nm or shorter.

The optical glass III preferably has a viscosity of 2 dPa·s or more at its liquidus temperature. Owing to the viscosity of 2 dPa·s or more that the optical glass III has at its liquidus temperature, the occurrence of internal striae can be decreased or inhibited when a molten glass is continuously cast into a casting mold to shape glass shaped materials. Further, the optical glass III enables the formation of a preform by a float-shaping method to be described later.

The optical glass III preferably has a viscosity of 2 dPa·s or more at its liquidus temperature, while the viscosity thereof at its liquidus temperature is more preferably 3 dPa·s or more, still more preferably 4 dPa·s or more, particularly preferably 6 dPa·s or more. While there is no limitation to be imposed on the upper limit of the viscosity, it is 30 dPa·s or less as a general criterion.

The optical glass III has high-refractivity high-dispersion properties. Specifically, the refractive index nd thereof is preferably 1.84 or more, more preferably 1.90 or more, still more preferably 1.95 or more, and the Abbe's number vd thereof is preferably 30 or less, more preferably 27.5 or less, still more preferably 25 or less. There is no limitation to be imposed on the upper limit of the refractive index, while it is preferably adjusted to 2.2 or less for keeping both the liquidus temperature and the glass transition temperature at low levels. There is no limitation to be imposed on the lower limit of the Abbe's number, while it is preferably adjusted to 10 or more for keeping both the liquidus temperature and the glass transition temperature at low levels.

The optical glass III has the property of being softened at a low temperature, and specifically, the glass transition temperature thereof is preferably 500° C. or lower, more preferably 480° C. or lower, still more preferably 460° C. or lower, yet more preferably 440° C. or lower, most preferably 420° C. or lower. The lower limit of the glass transition temperature is not specially limited, while the lower limit of the glass transition temperature is preferably adjusted to 300° C. for maintaining the above refractive index, Abbe's number and liquidus temperature. Having the above low glass transition temperature, the optical glass III is suitable for the field of use where a glass material is heated and press-molded to produce a glass molded product. When the glass transition temperature is low, press-molding can be carried out at a relatively low heating temperature, so that the deterioration and abrasion of a press mold, etc., can be decreased or prevented. In particular, the optical glass III is suitable for the field of use where molding is repeated many times with keeping the molding surface of a press mold highly accurate like precision press-molding.

The optical glass III is also excellent in weather resistance. The weather resistance of a glass can be represented by using a haze value as an index. The haze value refers to a percentage representation of a ratio of the intensity of scattered light to the intensity of total transmitted light when white light is transmitted through a flat glass plate having optically polished surfaces perpendicular to the polished surfaces, that is, "scattered light intensity/transmitted light intensity". The optical glass III preferably has a haze value of 10 or less, more preferably a haze value of 6 or less, still more preferably a haze value of 4 or less, most preferably a haze value of 0.1 to 3. A glass having a large haze value is a so-called chemically low-durability glass, which may be corroded in high velocity or generate reaction products on the glass surface due to water drops or vapors adhering to the glass and various chemical components such as glass components in a use environment. When such a glass is used as an optical element, foreign matter may occur on the surface of an optical glass element because of the corrosion of the glass or products generated on the glass surface, and the optical element may be degraded in optical properties such as a transmittance, etc., so that such a glass is undesirable as an optical glass composition. In particular, when a precision press-molding preform is produced, an altered layer on the surface has a detrimental effect on the precision press-molding, and it is hence required to give full attention to the weather resistance of a glass when it is to be applied to the above use. The optical glass III is free of the above problem since its haze value is small.

(Optical Glass IV)

The optical glasses (to be referred to as "optical glass IV" hereinafter) according to the fourth aspect of this invention described in the above (29) to (34) will be explained below.

The optical glass. IV comprises, by cationic %, 30 to 70% of $Bi^{3+}$, 5 to 50% of $B^{3+}$, 0.5 to 50% of $Si^{4+}$, 1 to 20% of $Al^{3+}$ and 0 to 2% of $Ga^{3+}$ and it has, by cationic %, a $Bi^{3+}$, $B^{3+}$, $Si^{4+}$ and $Al^{3+}$ total content of 96% or more.

In the optical glass IV, $Bi^{3+}$ is a component that works to increase both the refractivity and the dispersion. When it is introduced to excess, however, it decreases the stability and precipitates as a colloid in the glass to form a source that causes the scattering of light. The content of $Bi^{3+}$ is hence limited to 30 to 70%. The content of $Bi^{3+}$ is preferably in the range of 32 to 65%, more preferably in the range of 35 to 60%, still more preferably in the range of 37 to 57%, most preferably in the range of 40 to 55%.

$B^{3+}$ works as a network former, and it not only works to improve the glass in stability but also works to improve the glass in meltability. When it is introduced to excess, however, it decreases the refractivity, so that the content of $B^{3+}$ is limited to 5 to 50%. The content of $B^{3+}$ is preferably in the range of 7.5 to 50%, more preferably in the range of 10 to 50%, still more preferably in the range of 12.5 to 45%, most preferably in the range of 15 to 45%.

$Si^{4+}$ also works as a network former, and it not only works to improve the glass in stability but also works to improve the glass in chemical durability. When it is introduced to excess, however, the refractivity and meltability are decreased, and the glass transition temperature is increased, so that the content of $Si^{4+}$ is limited to 0.5 to 50%. The content of $Si^{4+}$ is preferably in the range of 1 to 40%, more preferably in the range of 1 to 30%, still more preferably 2 to 20%, most preferably 2 to 15%.

$Al^{3+}$ works not only to improve the glass in stability but also to improve the glass in chemical durability. When it is introduced to excess, however, the stability, refractivity and meltability are decreased, and the glass transition temperature is increased, so that the content of $Al^{3+}$ is limited to 1 to 20%. The content of $Al^{3+}$ is preferably in the range of 1 to 18%, more preferably in the range of 1 to 16%, still more preferably in the range of 1 to 15%, most preferably in the range of 1 to 13%.

While the total content of $Bi^{3+}$, $B^{3+}$, $Si^{4+}$ and $Al^{3+}$ is 96% or more, it is preferably 97% or more, more preferably 98% or more, yet more preferably 99% or more, particularly preferably 100%.

When $Ga^{3+}$ is introduced as the balance other than the above four components, the content thereof is limited to 0 to 2%. $Ga^{3+}$ has a relatively large molecular volume, and when it is introduced into a composition containing $Bi^{3+}$, $B^{3+}$, $Si^{4+}$ and $Al^{3+}$ as basic components, the stability is degraded. Therefore, the content of $Ga^{3+}$ is limited to 0 to 2%, preferably to 0 to 1%. Since $Ga^{3+}$ is a component that not only degrades the stability but also is very expensive, it is more preferred to introduce no $Ga^{3+}$.

$Ba^{2+}$ and $Zn^{2+}$ also have relatively large molecular volumes, and when they are introduced to excess, therefore, the stability is extremely degraded. Therefore, the total content of $Ba^{2+}$ and $Zn^{2+}$ is preferably limited to 0 to 3%, more preferably, to 0 to 1%, and it is still more preferred to introduce none of $Ba^{2+}$ and $Zn^{2+}$.

In the optical glass IV, the cationic ratio of $Al^{3+}/Si^{4+}$ is adjusted to 0.2 or more for maintaining the stability excellently. The above cationic ratio is preferably 0.3 and more. When the above cationic ratio is less than 0.2, the glass stability is degraded. For maintaining the meltability of the glass excellently, the cationic ratio of $Al^{3+}/Si^{4+}$ is preferably adjusted to 5 or less, more preferably, to 4.5 or less, still more preferably, to 4 or less.

As the balance other than $Bi^{3+}$, $B^{3+}$, $Si^{4+}$ and $Al^{3+}$, there can be introduced $Mg^{2+}$, $Ca^{2+}$, $Sr^{2+}$, $Li^+$, $Na^+$, $K^+$, $La^{3+}$, $Gd^{3+}$, $Y^{3+}$, $W^{6+}$, $Ta^{5+}$, $Nb^{5+}$, $Zr^{4+}$, $Ti^{4+}$, $In^{3+}$, $Ge^{4+}$, $P^{5+}$, $Ce^{4+}$, etc.

Of these, $Li^+$, $Na^+$ and $K^+$ exhibit volatility at a high temperature and they may cause the refractive index to vary and may cause striae to take place. Further, these components contribute to a further decrease in the glass transition temperature but work to decrease the chemical durability. From the viewpoint of the improvement of chemical stability, the stabilization of optical properties and the prevention of striae, therefore, the total content of $Li^+$, $Na^+$ and $K^+$ is preferably in the range of 0 to 3%, more preferably in the range of 0 to 2%, still more preferably in the range of 0 to 1%, and it is further preferred to introduce none of $Li^+$, $Na^+$ and $K^+$.

$Nb^{5+}$, $Zr^{4+}$ and $Ti^{4+}$ work to increase the refractivity, while they more intensely work to increase the glass transition temperature than $Bi^{4+}$. It is hence preferred to introduce none of $Nb^{5+}$, $Zr^{4+}$ and $Ti^{4+}$.

$Ce^{4+}$ work to inhibit $Bi^{3+}$ from precipitating as a colloid, while the introduction of an excess of $Ce^{4+}$ causes the glass to be colored. Therefore, the content thereof is preferably limited to 0 to 2%, more preferably, to 0 to 1%. The optical glass IV is a glass in which little or no colloid above is precipitated even if $Ce^{4+}$ is not added. $Ce^{4+}$ may degrade the transmittance in some cases when added, and it may deteriorate the molding surface of a press mold to be described later. It is hence still more preferred to introduce no $Ce^{4+}$.

$Pb^{4+}$, $Te^{4+}$, $Cd^{2+}$, $Tl^+$ and $Th^{4+}$ increase the refractivity but have toxicity, and it is hence preferred to introduce none of these for decreasing environmental burdens.

Concerning $Pb^{4+}$, when precision press-molding is carried out in a reducing atmosphere, Pb ion in the vicinity of the glass surface is reduced and precipitated as metallic lead, and the metallic lead adheres to a press mold and hampers the precision transfer of a molding surface form to the glass. For preventing this phenomenon, it is also desirable to introduce no Pb into the glass.

As a refiner, $Sb_2O_3$ can be added. The amount of $Sb_2O_3$ on the basis of a glass composition excluding $Sb_2O_3$ is preferably in the range of 0 to 1 mass %, more preferably 0 to 0.5 mass %.

Further, $As_2O_3$ exhibits a strong oxidizing action and greatly deteriorates the molding surface of a mold, and for preventing this deterioration, it is desirable to introduce no $As_2O_3$ into the glass.

In the optical glass IV, the liquidus temperature thereof is preferably 800° C. or lower, the $\lambda_{70}$ thereof is preferably 590 nm or shorter, and the viscosity thereof at its liquidus temperature is preferably 2 dPa·s or more.

The optical glass IV has a liquidus temperature of 800° C. or lower, and the temperature for melting the glass and the temperature at which the glass is caused to flow out can be decreased, so that it can prevent the above corrosion of a glass melting vessel, a stirrer, a pipe, etc., and the inclusion of foreign matter generated by the corrosion in the glass. Further, the optical glass IV can also produce an effect that it decreases the above-described dissolved platinum ion, etc., in the glass, which cause the coloring, and the above-described dissolved $SiO_2$, alumina, etc., from those constituting the vessel, etc., in the glass, which causes a decrease in refractivity and an increase in glass transition temperature. Further, even when a volatile component such as $B^{3+}$ is contained, the volatilization of such a volatile component is suppressed during melting or molding, and hence the optical glass IV can be stably imparted with optical properties such as a refractive index and an Abbe's number.

Since the optical glass IV has a low liquidus temperature of 800° C. or lower, a precision press-molding preform can be advantageously produced therefrom, while this point will be described later.

The liquidus temperature of the optical glass IV is preferably 800° C. or lower, more preferably 780° C. or lower, still more preferably 760° C. or lower, particularly preferably 740° C. or lower. Although the lower limit of the liquidus temperature is not specially limited, it is desirably approximately 550° C. or higher for materializing the optical properties and glass transition temperature that are desired.

In spite of a large content of $Bi^{3+}$, the optical glass IV is little colored, and its $\lambda_{70}$ is preferably 590 nm or shorter. The $\lambda_{70}$ is more preferably 570 nm or shorter, still more preferably 550 nm or shorter, particularly preferably 540 nm or shorter.

The optical glass IV preferably has a viscosity of 2 dPa·s or more at its liquidus temperature. Owing to the viscosity of 2 dPa·s or more that the optical glass IV has at its liquidus temperature, the occurrence of internal striae can be decreased or inhibited when a molten glass is continuously cast into a casting mold to shape glass shaped materials. Further, the optical glass IV enables the formation of a preform by a float-shaping method.

The optical glass IV preferably has a viscosity of 2 dPa·s or more at its liquidus temperature, while the viscosity thereof at its liquidus temperature is more preferably 3 dPa·s or more, still more preferably 4 dPa·s or more, particularly preferably 6 dPa·s or more. While there is no limitation to be imposed on the upper limit of the viscosity, it is 30 dPa·s or less as a general criterion.

The optical glass IV has high-refractivity high-dispersion properties. Specifically, the refractive index nd thereof is preferably 1.84 or more, more preferably 1.90 or more, still more preferably 1.95 or more, and the Abbe's number νd thereof is preferably 30 or less, more preferably 27.5 or less, still more preferably 25 or less. There is no limitation to be imposed on the upper limit of the refractive index, while it is preferably adjusted to 2.2 or less for keeping both the liquidus temperature and the glass transition temperature at low levels. There is no limitation to be imposed on the lower limit of the Abbe's number, while it is preferably adjusted to 10 or more for keeping both the liquidus temperature and the glass transition temperature at low levels.

The optical glass IV has the property of being softened at a low temperature, and specifically, the glass transition temperature thereof is preferably 500° C. or lower, more preferably 480° C. or lower, still more preferably 460° C. or lower, yet more preferably 440° C. or lower, most preferably 420° C. or lower. The lower limit of the glass transition temperature is not specially limited, while the lower limit of the glass transition temperature is preferably adjusted to 300° C. for maintaining the above refractive index, Abbe's number and liquidus temperature. Having the above low glass transition temperature, the optical glass IV is suitable for the field of use where a glass material is heated and press-molded to produce a glass molded product. When the glass transition temperature is low, press-molding can be carried out at a relatively low heating temperature, so that the deterioration and abrasion of a press mold, etc., can be decreased or prevented. In particular, the optical glass IV is suitable for the field of use where molding is repeated many times with keeping the molding surface of a press mold highly accurate like precision press-molding.

The optical glass IV is also excellent in weather resistance. The weather resistance of a glass can be represented by using a haze value as an index. The haze value refers to a percentage representation of a ratio of the intensity of scattered light to the intensity of total transmitted light when white light is transmitted through a flat glass plate having optically polished surfaces perpendicular to the polished surfaces, that is, "scattered light intensity/transmitted light intensity". The optical glass IV preferably has a haze value of 10 or less, more preferably a haze value of 6 or less, still more preferably a haze value of 4 or less, most preferably a haze value of 0.1 to 3. A glass having a large haze value is a so-called chemically low-durability glass, which may be corroded in high velocity or generate reaction products on the glass surface in high velocity due to water drops or vapors adhering to the glass and various chemical components such as glass components in a use environment. When such a glass is used as an optical element, foreign matter may occur on the surface of an optical glass element because of the corrosion of the glass or a product generated on the glass surface and the optical element may be degraded in optical properties such as a transmittance, etc., so that such a glass is undesirable as an optical glass composition. In particular, when a precision press-molding preform is produced, an altered layer on the surface has a detrimental effect on the precision press-molding, and it is hence required to give full attention to the weather resistance of a glass when it is to be applied to the above use. The optical glass IV is free of the above problem since its haze value is small.

(Precision Press-Molding Preform and Process for the Production Thereof)

The precision press-molding preform of this invention described in the above (35) and the process for the production of a precision press-molding, provided by this invention and described in the above (36), will be explained below.

The precision press-molding preform of this invention is a precision press-molding preform (to be referred to as "preform" hereinafter) formed of any one of the above optical glasses (I), (II), (III) and (IV).

The preform is a glass shaped material having a mass close to the mass of a precision press-molded product and is shaped in a proper form depending upon the form of the precision press-molded product. The form thereof includes, for example, the form of a sphere, the form of a spheroid, etc. The preform is heated so as to have a viscosity that enables the precision press-molding, and then it is supplied to the precision press-molding. The preform of this invention may have a thin film such as a carbon-containing film (preferably, a carbon film) or the like on its surface as required.

The preform of this invention is obtained by casting a molten glass into a mold to prepare a glass shaped material, annealing the glass shaped material, cutting or splitting it into glass pieces having a desired size each and grinding and polishing a glass piece. As other preform production method, there can be employed a method in which the above glass piece is re-heated and press-molded and the thus-obtained press-molded product is ground and polished to produce a preform, a method in which a molten glass gob is press-molded and the thus-obtained press-molded product is ground and polished to produce a preform, a method in which a molten glass is dropped and a dropped glass is cooled to solidness in air to produce a preform, a method in which a molten glass gob is introduced into a liquid and cooled to solidness to produce a preform, a method in which a molten glass gob is introduced into a liquid and cooled to solidness to obtain a glass shaped material and this shaped material is ground and polished to produce a preform. In contrast, the process for the production of a preform, provided by this invention, has advantages that it obviates grinding and polishing and that the size of a preform is not limited to a size determined by dropping a molten glass.

That is, the process for the production of a preform, provided by this invention, is a process for producing a precision press-molding preform, which comprises causing a molten glass obtained by melting glass raw materials to flow out, separating a molten glass gob from said molten glass and shaping said glass gob into the precision press-molding preform formed of the above optical glass of this invention in the process of said glass gob being cooled to solidness.

The above process can be materialized when a glass for constituting a preform has high stability in a high-temperature region and when the viscosity of a molten glass that is flowing out can be increased.

In a specific embodiment of the process for the production of a preform, provided by this invention, a molten glass is caused to flow out of a pipe and a molten glass gob is separated. In the separation, a cut mark called a shear mark is not to remain on the preform surface. For this purpose, cutting or separation with a cutting blade is not to be employed. The method for the separation includes a method in which a molten glass is dropped from a flow pipe or a method in which the forward end portion of a molten glass flow that is caused to flow out of a flow pipe is supported and the support is removed timely so that a molten glass gob having a predetermined weight can be separated (down-moving cutting method). In the down-moving cutting method, a glass is separated at a narrow portion generated between the forward end side of a molten glass flow and the flow pipe side thereof, whereby a molten glass gob having a predetermined weight can be obtained.

The separated molten glass gob is shaped into a preform on a preform shaping mold. When a molten glass comes in contact with a shaping mold having a high temperature, fusion takes place. An increase in the temperature of the shaping mold is controlled to keep the shaping mold at a sufficiently lower temperature than the temperature of the molten glass gob. When the glass gob keeps the state of being in contact with the shaping mold, creases occur on the glass surface and no preform having a smooth surface can be produced. Therefore, upward gas pressure is applied to the glass gob over the above shaping mold, and the glass gob is shaped into a preform in this state (which is called "float-shaping method"). In this manner, a preform having a smooth surface can be shaped.

When a preform is shaped by a float-shaping method, gas for floating a glass (which is called "floating gas") enters a low-viscosity glass gob when the molten glass to be introduced into the shaping mold has a low viscosity. Therefore, floating power cannot be applied, and moreover, the low-viscosity glass gob catches floating gas to include it, so that no preform can be shaped. Further, when a glass has a low viscosity when it is caused to flow out, it is difficult to apply the down-moving cutting method to the glass.

In any case, it is required to increase the viscosity of the glass at the initial stage of preform shaping to such an extent that the shaping can be carried out. When the temperature at which the glass is caused to flow out is made to be lower than the liquidus temperature for that purpose, the glass is devitrified unless it is excellent in stability.

Since the process for the production of a preform, provided by this invention, uses the glass excellent in stability, the viscosity at a liquidus temperature is in the range suitable for the shaping, and a preform can be shaped by the float-shaping method without devitrifying the glass.

Further, since the molten glass gob is obtained by separating it from a molten glass, the mass accuracy of the preform can be improved and is higher than that of a preform obtained by dividing a solid glass, and since the preform is shaped directly from the molten glass gob, there occurs no glass dust that is from cutting, grinding and polishing. Therefore, the production efficiency is improved and the utilization factor of a glass is improved, so that the production cost can be kept relatively low even if an expensive raw material is used.

(Optical Element and Process for the Production of Optical Element)

The optical element of this invention described in the above (37) and the process for the production of an optical element, provided by this invention described in the above (37) to (40), will be explained below.

The optical element of this invention is formed of the above optical glass of this invention. The optical element of this invention has high-refractivity high-dispersion properties like the optical glass of this invention constituting the optical element.

Examples of the optical element of this invention include various lenses such as a spherical lens, an aspherical lens, a microlens, etc., a diffraction grating, a lens with a diffraction grating, a lens array, a prism, etc. From the viewpoint of a form, the optical element includes a concave meniscus lens, a biconcave lens, a plano-concave lens, a convex meniscus lens, a biconvex lens, a plano-convex lens, etc. The above optical element is desirably obtained by heating and precision press-molding the preform of this invention.

These optical elements can be provided with optical thin films such as an antireflection film, a total reflection film, a partial reflection film, a film having spectral properties, etc., as required.

The process for the production of an optical element will be explained below.

The process for the production of an optical element, provided by this invention, is a process for the production of an optical element, which comprises heating the above precision press-molding preform or a precision press-molding preform produced by the above process and precision press-molding the same with a press mold.

The precision press-molding method is also called "optics molding method" and is already well known in the technical field of this invention.

The optical element surface that transmits, refracts, diffracts or reflects light is called an optically functional surface. For example, when the case of a lens is taken, the aspherical surface of an aspherical lens and the spherical surface of a spherical lens correspond to the optically functional surface. The precision press-molding method is a method for forming an optically functional surface by press-molding in which the form of molding surface of a press mold is precisely transferred to a glass. That is, it obviates machine processes such as grinding and polishing for completing the optically functional surface.

Therefore, the process for the production of an optical element, provided by this invention, is suitable for producing optical elements such as a lens, a lens array, a diffraction grating, a prism, etc., and in particular it is the most suitable for producing aspherical lenses highly productively.

According to the process for the production of an optical element, provided by this invention, not only optical elements having the above optical properties can be produced, but also preforms formed of the optical glass having the property of being softened at a low temperature are used. Therefore, pressing is permitted at a relatively low temperature for the press-molding of a glass, so that a burden on the molding surface of a press mold is reduced and that the lifetime of a mold (or a release film when it is formed on the molding surface) can be extended. Since the glass constituting the preform has high stability, further, the devitrification of the glass in the steps of re-heating and pressing can be effectively prevented. Further, a series of steps starting with the step of melting a glass and ending with the step of obtaining a final product can be carried out highly productively.

As a press mold for the precision press-molding method, there can be used known press molds such as a press mold made of silicon carbide, an ultra-hard material or stainless steel and provided with a release film on its molding surface. The release film can be selected from a carbon-containing film, a noble metal alloy film, or the like. The press mold has an upper mold member and a lower mold member and has a sleeve member as required. Above all, for effectively reducing or preventing the breaking of a glass molded product during press-molding, it is more preferred to use a press mold made of silicon carbide or a press mold made of an ultra-hard alloy (in particular, a press mold made of a binder-free ultra-hard alloy, e.g., a press mold made of WC), and still more preferably, the above mold is provided with a carbon-containing film on its molding surface.

In the precision press-molding, desirably, a non-oxidizing gas atmosphere is employed as an atmosphere during molding, for maintaining the molding surface of a press mold in an excellent state. As a non-oxidizing gas, nitrogen or a gas mixture of nitrogen with hydrogen is preferred. In particular, when a press mold having a carbon-containing film as a release film on its molding surface or a press mold made of silicon carbide is used, the precision press-molding is to be carried out in the above non-oxidizing atmosphere.

The process for the production of an optical element, provided by this invention, will be explained below.

(Precision Press-Molding Method 1)

This method is a method in which a preform is introduced into a press mold, the preform and the press mold are heated together and the preform is precision press-molded (to be referred to as "precision press-molding method 1" hereinafter).

In the precision press-molding method 1, preferably, the press mold and the above preform are heated to a temperature at which the glass constituting the preform exhibits a viscosity of $10^6$ to $10^{12}$ dPa·s to carry out the precision press-molding.

Further, desirably, a precision press-molded product is taken out of the press mold after it is cooled to a temperature at which the above glass preferably exhibits a viscosity of $10^{12}$ dPa·s or more, more preferably $10^{14}$ dPa·s or more, still more preferably $10^{16}$ dPa·s or more.

Under the above conditions, not only the form of the molding surface of the press mold can be precisely transferred to the glass, but also the precision press-molded product can be taken out without any deformation.

(Precision Press-Molding 2)

This method is a method in which a preform that is preheated is introduced to a press mold to carry out the precision press-molding (to be referred to as "precision press-molding 2" hereinafter). According to this method, preforms are preheated before they are introduced into the press mold, so that optical elements free of surface defects and excellent in surface accuracy can be produced in a production cycle that is shortened.

The temperature for pre-heating the press mold is preferably set at a temperature lower than the above temperature for pre-heating the preform. Since the temperature for heating the press mold can be made to be low owing to the above preform pre-heating, the abrasion of the press mold can be decreased.

In the precision press-molding method 2, the above preform is preferably pre-heated to a temperature at which the glass constituting the preform exhibits a viscosity of $10^9$ dPa·s or less, more preferably, $10^9$ dPa·s.

Further, preferably, the above preform is pre-heated while it is caused to float. Further, the above preform is more preferably pre-heated to a temperature at which the glass constituting the above preform exhibits a viscosity of $10^{5.5}$ to $10^9$ dPa·s, and it is still more preferably pre-heated to a temperature at which the glass constituting the preform exhibits a viscosity of $10^{5.5}$ or more but less than $10^9$ dPa·s. Further, preferably, the cooling of the glass is started upon the start of pressing or during the pressing.

In addition, the press mold is temperature-adjusted to a temperature lower than the pre-heating temperature for the preform, and the temperature adjustment can be made using, as a general criterion, a temperature at which the above glass exhibits a viscosity of $10^9$ to $10^{12}$ dPa·s.

In this method, preferably, a press-molded product is taken out of the mold after cooled until the above glass has a viscosity of $10^{12}$ dPa·s or more.

The optical element obtained by the precision press-molding is taken out of the press mold and gradually cooled as required. When the molded product is an optical element such as a lens or the like, an optical thin film may be coated on the surface thereof as required.

The above optical element such as an aspherical lens or the like is suitable as a part for a high-performance and compact image-sensing optical system, and it is suitable for image-sensing optical systems for a digital still camera, a digital video camera, a camera mounted on a cellphone, an in-vehicle camera, etc.

EXAMPLES

This invention will be explained below with reference to Examples.

Examples 1-40

Tables 1 to 5 show compositions of optical glasses of Examples 1 to 40. Of Examples 1 to 40, Examples 1 to 40 correspond to the optical glass I, Examples 4, 12, 19 to 22, to 27, 31, 34 and 38 correspond to the optical glass II, Examples 1 to 40 corresponds to the optical glass III, and Examples 1 to 12, 14, 17, 18, 22 to 37, 39 and 40 correspond to the optical glass IV.

In each Example, oxides, hydroxides, carbonates and nitrates as raw materials for components for an optical glass were weighed so as to obtain a composition shown in one of Tables 1 to 5 after the formation of the optical glass, and fully mixed, the mixture was charged into a platinum crucible, a gold crucible or an $SiO_2$ crucible and melted in an electric furnace at a temperature of approximately 850 to 1,000° C. and a molten glass was homogenized by stirring, refined and then cast into a die that had been pre-heated to a proper temperature. The cast glass was cooled to a temperature around its transition temperature, and immediately thereafter it was placed in an annealing furnace and gradually cooled to room temperature to give an optical glass. When optical glasses obtained in the above manner were visually observed, there were found none of foreign matters such as platinum grains, gold grains, etc., striae and devitrification.

Alternatively, the above-mixture of raw materials was once pre-melted in an $SiO_2$ crucible, an alumina crucible, a zirconia crucible or a non-metallic crucible such as a carbon crucible, or the like, the resultant cullet or melt was placed in a metal crucible such as a platinum crucible, a gold crucible or the like and melted in an electric furnace at a temperature of approximately 850 to 1,000° C. and a molten glass was homogenized by stirring, refined and then cast into a die that had been pre-heated to a proper temperature. The cast glass was cooled to its transition temperature, and immediately thereafter it was placed in an annealing furnace and gradually cooled to room temperature to give an optical glass. When optical glasses obtained in the above manner were visually observed, there were found none of foreign matters, striae and devitrification. Each of the optical glasses obtained by the above methods was measured for a refractive index nd, an Abbe's number vd, a transmittance, a glass transition temperature, a sag temperature and a specific gravity by the following methods. Tables 1 to 5 show the results.

(1) Refractive index $n_d$ and Abbe's number $v_d$

An optical glass obtained by adjusting a gradual cooling rate at −30° C./hour was measured.

(2) Transmittance

A glass so polished as to have a thickness of 10±1 mm was measured for spectral transmittance (including a surface reflection loss) in a wavelength region of 280 nm to 700 nm, and wavelengths at which transmittances of 70% and 5% were exhibited are expressed as $\lambda_{70}$ and $\lambda_5$.

(3) Glass transition temperature Tg

Measurements were made at a temperature elevation rate of 5-10° C./minute with a differential scanning calorimeter 3000S supplied by BLUKER AXS K.K. (formerly, MAC Science Japan).

(4) Specific gravity

Calculated according to an Archimedean method.

(5) Haze value

Measurements were made according to Japan Optical glass Industrial Society Standard JOGIS07-1975 "Method for measuring chemical durability of optical glass (surface method)". A flat glass-plate (2×20×20 mm) of which both surfaces had been optically polished was washed and held in a clean constant-temperature constant-humidity container having a temperature of 65° C. and a humidity of 90% for 1 week, and after the holding, it was measured for a haze value with a haze meter (an AUTOMATIC HAZE METER MODEL TC-HIIIDPK supplied by Tokyo Denshoku Co., Ltd.). In addition, a dense barium type glass (M-BACD5N, supplied by HOYA CORPORATION) designated in the above Standard was used as a reference.

(6) Liquidus temperature and viscosity at liquidus temperature (liquidus viscosity)

A glass was further homogenized by re-heating and re-melting and rapidly cooled to obtain 20 to 50 g of a glass as a sample. This sample was temperature-increased to a predetermined temperature, held for 2 hours and temperature-decreased to room temperature and it was observed for a crystal through a polarization microscope. When no crystal was found, it was determined that the liquidus temperature was the above predetermined temperature or lower.

The viscosity of a glass decreases with an increase in temperature and increases with a decrease in temperature. The viscosity at a liquidus temperature therefore refers to a value which is equivalent to, or larger than, a value of the viscosity at a temperature equivalent to, or higher than, the liquidus temperature.

At each of some different temperatures in a high-temperature region over the liquidus temperature, a glass was measured for a viscosity by a rotating-cylinder method, and a viscosity ("viscosity A" hereinafter) at the above predetermined temperature at which no crystal was found was determined by extrapolation. The viscosity at a liquidus temperature is the above viscosity A or higher.

As an apparatus for the above measurement with the rotating-cylinder method, a high-temperature viscosity measuring apparatus supplied by Tokyo Kogyo Co., Ltd. was used.

TABLE 1

| | | Example No. | | | | | | | |
|---|---|---|---|---|---|---|---|---|---|
| | | 1 | 2 | 3 | 4 | 5 | 6 | 7 | 8 |
| Component (cat %) | $B^{3+}$ | 25.0 | 22.5 | 20.0 | 22.5 | 22.5 | 22.5 | 22.5 | 22.5 |
| | $Si^{4+}$ | 10.0 | 10.0 | 10.0 | 10.0 | 10.0 | 10.0 | 10.0 | 10.0 |
| | $Al^{3+}$ | 10.0 | 10.0 | 10.0 | 10.0 | 10.0 | 10.0 | 10.0 | 10.0 |
| | $Bi^{3+}$ | 55.0 | 57.5 | 60.0 | 55.0 | 55.0 | 55.0 | 55.0 | 55.0 |
| | $Li^+$ | | | | | | | | |
| | $Na^+$ | | | | | | | | 2.5 |
| | $K^+$ | | | | | | | | |
| | $Mg^{2+}$ | | | | | | 2.5 | | |
| | $Ca^{2+}$ | | | | | 2.5 | | | |
| | $Sr^{2+}$ | | | | | | | | |
| | $La^{3+}$ | | | | | | 2.5 | | |
| | $Gd^{3+}$ | | | | | | | 2.5 | |
| | $Y^{3+}$ | | | | | | | | |
| | $W^{6+}$ | | | | | | | | |
| | $Ta^{5+}$ | | | | | | | | |
| | $Nb^{5+}$ | | | | | | | | |
| | $Zr^{4+}$ | | | | | | | | |
| | $Ti^{4+}$ | | | | | | | | |
| | $Sb^{3+}$ | | | | | | | | |
| | $Ge^{4+}$ | | | | | | | | |
| | $Sn^{4+}$ | | | | | | | | |
| | $Ce^{4+}$ | | | | | | | | |
| | $Zn^{2+}$ | | | | | | | | |
| | $Ba^{2+}$ | | | | | | | | |
| Total | | 100.0 | 100.0 | 100.0 | 100.0 | 100.0 | 100.0 | 100.0 | 100.0 |
| $Mg^{2+} + Ca^{2+} + Sr^{2+}$ | | | | | | 2.5 | 2.5 | | |
| $Al^{3+}/(Mg^{2+} + Ca^{2+} + Sr^{2+})$ | | | | | | 4.0 | 4.0 | | |
| $Li^+ + Na^+ + K^+$ | | | | | | | | | 2.5 |
| $La^{3+} + Gd^{3+} + Y^{3+}$ | | | | | | | 2.5 | 2.5 | |
| $Ba^{2+} + Zn^{2+}$ | | | | | | | | | |
| $Al^{3+}/Si^{4+}$ | | 1.00 | 1.00 | 1.00 | 1.00 | 1.00 | 1.00 | 1.00 | 1.00 |
| SG | | 6.831 | 6.961 | 7.089 | 6.813 | 6.844 | 6.960 | 6.946 | 6.838 |
| LT | (° C.) | ≦680 | ≦700 | ≦700 | ≦700 | ≦750 | ≦750 | ≦750 | ≦750 |
| Tg | (° C.) | 401 | 396 | 389 | 401 | 402 | 408 | 408 | 387 |
| nd | | 2.11057 | 2.13256 | 2.15490 | 2.11388 | 2.11601 | 2.12146 | 2.12044 | 2.11024 |
| vd | | 16.97 | 16.42 | 15.87 | 16.69 | 16.74 | 16.84 | 16.88 | 16.47 |
| VMT | (° C.) | 680 | | | | | | | |
| Viscosity | (dPa·S) | 17.245 | | | | | | | |
| LV | (dPa·S) | ≧17.245 | | | | | | | |
| Coloring Degree | λ 70 (nm) | 535 | 547 | 570 | 541 | 549 | 534 | 533 | 536 |
| | λ 5 (nm) | 433 | 440 | 453 | 440 | 435 | 434 | 434 | 439 |

TABLE 1-continued

| | | \multicolumn{8}{c}{Example No.} |
|---|---|---|---|---|---|---|---|---|---|

| | | 1 | 2 | 3 | 4 | 5 | 6 | 7 | 8 |
|---|---|---|---|---|---|---|---|---|---|
| Haze value | Max. v | 0.9 | | | 0.9 | | | | |
| | Min. v | 0.5 | | | 0.5 | | | | |
| Note | | \multicolumn{8}{l}{Haze value measured using dense barium crown type glass (HOYA: M-BACD5N, haze value 8-9) as a reference.} |

SG: Specific gravity
LT: Liquidus temperature
Tg: Glass transition temperature
nd: Refractive index
vd: Abbe's number
VMT: Viscosity measurement temperature
LV: Liquidus viscosity
Max. v: Maximum value
Min. v: Minimum value

TABLE 2

| | | \multicolumn{8}{c}{Example No.} |
|---|---|---|---|---|---|---|---|---|---|

| | | 9 | 10 | 11 | 12 | 13 | 14 | 15 | 16 |
|---|---|---|---|---|---|---|---|---|---|
| Component (cat %) | $B^{3+}$ | 17.5 | 25.0 | 25.0 | 25.0 | 25.0 | 35.0 | 25.0 | 25.0 |
| | $Si^{4+}$ | 17.5 | 10.0 | 10.0 | 10.0 | 10.0 | 10.0 | 10.0 | 10.0 |
| | $Al^{3+}$ | 10.0 | 10.0 | 10.0 | 10.0 | 10.0 | 10.0 | 10.0 | 10.0 |
| | $Bi^{3+}$ | 55.0 | 52.5 | 52.5 | 52.5 | 50.0 | 45.0 | 45.0 | 42.5 |
| | $Li^+$ | | | | | 5.0 | | 10.0 | 12.5 |
| | $Na^+$ | | | | | | | | |
| | $K^+$ | | | | | | | | |
| | $Mg^{2+}$ | | | | | | | | |
| | $Ca^{2+}$ | | | | 2.5 | | | | |
| | $Sr^{2+}$ | | | | | | | | |
| | $La^{3+}$ | | 2.5 | | | | | | |
| | $Gd^{3+}$ | | | 2.5 | | | | | |
| | $Y^{3+}$ | | | | | | | | |
| | $W^{6+}$ | | | | | | | | |
| | $Ta^{5+}$ | | | | | | | | |
| | $Nb^{5+}$ | | | | | | | | |
| | $Zr^{4+}$ | | | | | | | | |
| | $Ti^{4+}$ | | | | | | | | |
| | $Sb^{3+}$ | | | | | | | | |
| | $Ge^{4+}$ | | | | | | | | |
| | $Sn^{4+}$ | | | | | | | | |
| | $Ce^{4+}$ | | | | | | | | |
| | $Zn^{2+}$ | | | | | | | | |
| | $Ba^{2+}$ | | | | | | | | |
| Total | | 100.0 | 100.0 | 100.0 | 100.0 | 100.0 | 100.0 | 100.0 | 100.0 |
| $Mg^{2+} + Ca^{2+} + Sr^{2+}$ | | | | | 2.5 | | | | |
| $Al^{3+}/(Mg^{2+} + Ca^{2+} + Sr^{2+})$ | | | | | 4.0 | | | | |
| $Li^+ + Na^+ + K^+$ | | | | | | 5.0 | | 10.0 | 12.5 |
| $La^{3+} + Gd^{3+} + Y^{3+}$ | | | 2.5 | 2.5 | | | | | |
| $Ba^{2+} + Zn^{2+}$ | | | | | | | | | |
| $Al^{3+}/Si^{4+}$ | | 0.57 | 1.00 | 1.00 | 1.00 | 1.00 | 1.00 | 1.00 | 1.00 |
| SG | | 6.694 | 6.773 | 6.810 | 6.681 | 6.587 | 6.257 | 6.309 | 7.168 |
| LT | (° C.) | ≦750 | ≦750 | ≦730 | ≦680 | ≦750 | ≦730 | ≦800 | ≦800 |
| Tg | (° C.) | 416 | 411 | 414 | 407 | 389 | 433 | 383 | 379 |
| nd | | 2.08349 | 2.09914 | 2.09850 | 2.09100 | 2.07788 | 2.02022 | 2.04098 | 2.02256 |
| vd | | — | 17.44 | 17.46 | 17.28 | 17.48 | 19.50 | 18.10 | 18.43 |
| VMT | (° C.) | | | | | 730 | | | |
| Viscosity | (dPa·s) | | | | | 6.555 | | | |
| LV | (dPa·s) | | | | | ≧6.555 | | | |
| Coloring Degree | λ 70 (nm) | 523 | 526 | 519 | 529 | 522 | 474 | 515 | 513 |
| | λ 5 (nm) | 425 | 429 | 427 | 431 | 428 | 406 | 425 | 424 |
| Haze value | Max. v | | 0.9 | | | 0.5 | 0.8 | | |
| | Min. v | | 0.4 | | | 0.4 | 0.5 | | |
| Note | | \multicolumn{8}{l}{Haze value measured using dense barium crown type glass (HOYA: M-BACD5N, haze value 8-9) as a reference.} |

SG: Specific gravity
LT: Liquidus temperature
Tg: Glass transition temperature
nd: Refractive index
vd: Abbe's number
VMT: Viscosity measurement temperature
LV: Liquidus viscosity
Max. v: Maximum value
Min. v: Minimum value

TABLE 3

| | | \multicolumn{8}{c}{Example No.} | | | | | | | |
|---|---|---|---|---|---|---|---|---|---|
| | | 17 | 18 | 19 | 20 | 21 | 22 | 23 | 24 |
| Component (cat %) | $B^{3+}$ | 25.0 | 22.5 | 25.0 | 25.0 | 25.0 | 25.0 | 31.3 | 29.4 |
| | $Si^{4+}$ | 10.0 | 10.0 | 10.0 | 10.0 | 10.0 | 10.0 | 12.5 | 11.8 |
| | $Al^{3+}$ | 12.5 | 12.5 | 10.0 | 10.0 | 10.0 | 7.5 | 12.5 | 11.8 |
| | $Bi^{3+}$ | 52.5 | 55.0 | 50.0 | 45.0 | 45.0 | 55.0 | 43.8 | 44.1 |
| | $Li^+$ | | | | | 5.0 | | | 2.9 |
| | $Na^+$ | | | | | | | | |
| | $K^+$ | | | | | | | | |
| | $Mg^{2+}$ | | | | | | | | |
| | $Ca^{2+}$ | | | 5.0 | 10.0 | 5.0 | 2.5 | | |
| | $Sr^{2+}$ | | | | | | | | |
| | $La^{3+}$ | | | | | | | | |
| | $Gd^{3+}$ | | | | | | | | |
| | $Y^{3+}$ | | | | | | | | |
| | $W^{6+}$ | | | | | | | | |
| | $Ta^{5+}$ | | | | | | | | |
| | $Nb^{5+}$ | | | | | | | | |
| | $Zr^{4+}$ | | | | | | | | |
| | $Ti^{4+}$ | | | | | | | | |
| | $Sb^{3+}$ | | | 400 ppm | 400 ppm | 400 ppm | 400 ppm | | |
| | $Ge^{4+}$ | | | | | | | | |
| | $Sn^{4+}$ | | | | | | | | |
| | $Ce^{4+}$ | | | | | | | | |
| | $Zn^{2+}$ | | | | | | | | |
| | $Ba^{2+}$ | | | | | | | | |
| Total | | 100.0 | 100.0 | 100.0 | 100.0 | 100.0 | 100.0 | 100.0 | 100.0 |
| $Mg^{2+} + Ca^{2+} + Sr^{2+}$ | | | | 5.0 | 10.0 | 5.0 | 2.5 | | |
| $Al^{3+}/(Mg^{2+} + Ca^{2+} + Sr^{2+})$ | | | | 2.0 | 1.0 | 2.0 | 3.0 | | |
| $Li^+ + Na^+ + K^+$ | | | | | | 5.0 | | | 2.9 |
| $La^{3+} + Gd^{3+} + Y^{3+}$ | | | | | | | | | |
| $Ba^{2+} + Zn^{2+}$ | | | | | | | | | |
| $Al^{3+}/Si^{4+}$ | | 1.25 | 1.25 | 1.00 | 1.00 | 1.00 | 0.75 | 1.00 | 1.00 |
| SG | | 6.666 | 6.780 | 6.530 | 6.217 | 6.266 | 6.867 | 6.104 | 6.162 |
| LT | (° C.) | ≦700 | ≦730 | ≦730 | ≦750 | ≦730 | ≦730 | ≦730 | ≦730 |
| Tg | (° C.) | 411 | 408 | 413 | 424 | 401 | 391 | 441 | 417 |
| nd | | 2.08291 | 2.10190 | 2.07293 | 2.03526 | 2.03857 | 2.12048 | 1.99470 | 2.00805 |
| vd | | 17.54 | 17.02 | 17.61 | 18.38 | 18.27 | 16.71 | 20.02 | 19.45 |
| VMT | (° C.) | | | 730 | | | | | |
| Viscosity | (dPa · S) | | | 10.747 | | | | | |
| LV | (dPa · S) | | | ≧10.747 | | | | | |
| Coloring Degree | λ 70 (nm) | 514 | 540 | 497 | 478 | 489 | 511 | 476 | 467 |
| | λ 5 (nm) | 423 | 430 | 424 | 423 | 422 | 429 | 405 | 408 |
| Haze value | Max. v | | | | | | | | |
| | Min. v | | | | | | | | |
| Note | | \multicolumn{8}{l}{Haze value measured using dense barium crown type glass (HOYA: M-BACD5N, haze value 8-9) as a reference.} | | | | | | | |

SG: Specific gravity
LT: Liquidus temperature
Tg: Glass transition temperature
nd: Refractive index
vd: Abbe's number
VMT: Viscosity measurement temperature
LV: Liquidus viscosity
Max. v: Maximum value
Min. v: Minimum value

TABLE 4

| | | \multicolumn{8}{c}{Example No.} | | | | | | | |
|---|---|---|---|---|---|---|---|---|---|
| | | 25 | 26 | 27 | 28 | 29 | 30 | 31 | 32 |
| Component (cat %) | $B^{3+}$ | 25.0 | 25.0 | 25.0 | 25.0 | 32.5 | 25.0 | 30.0 | 45.0 |
| | $Si^{4+}$ | 10.0 | 10.0 | 10.0 | 10.0 | 2.5 | 10.0 | 7.5 | 5.0 |
| | $Al^{3+}$ | 10.0 | 10.0 | 10.0 | 9.0 | 10.0 | 7.0 | 7.5 | 5.0 |
| | $Bi^{3+}$ | 51.0 | 51.0 | 51.0 | 55.0 | 55.0 | 55.0 | 50.0 | 45.0 |
| | $Li^+$ | 2.0 | 3.0 | 1.0 | | | | | |
| | $Na^+$ | | | | | | | | |
| | $K^+$ | | | | | | | | |
| | $Mg^{2+}$ | | | | | | | | |
| | $Ca^{2+}$ | 2.0 | 1.0 | 3.0 | | | | 2.5 | |
| | $Sr^{2+}$ | | | | | | | | |
| | $La^{3+}$ | | | | | | | 1.5 | |

TABLE 4-continued

|  |  | Example No. | | | | | | | |
|---|---|---|---|---|---|---|---|---|---|
|  |  | 25 | 26 | 27 | 28 | 29 | 30 | 31 | 32 |
|  | $Gd^{3+}$ |  |  |  |  |  |  |  |  |
|  | $Y^{3+}$ |  |  |  |  |  |  |  |  |
|  | $W^{6+}$ |  |  |  |  |  |  |  |  |
|  | $Ta^{5+}$ |  |  |  |  |  |  |  |  |
|  | $Nb^{5+}$ |  |  |  |  |  |  |  |  |
|  | $Zr^{4+}$ |  |  |  |  |  |  |  |  |
|  | $Ti^{4+}$ |  |  |  | 1.0 |  | 3.0 | 1.0 |  |
|  | $Sb^{3+}$ | 400 ppm | 400 ppm | 400 ppm | 400 ppm | 400 ppm | 400 ppm | 400 ppm | 400 ppm |
|  | $Ge^{4+}$ |  |  |  |  |  |  |  |  |
|  | $Sn^{4+}$ |  |  |  |  |  |  |  |  |
|  | $Ce^{4+}$ |  |  |  |  |  |  |  |  |
|  | $Zn^{2+}$ |  |  |  |  |  |  |  |  |
|  | $Ba^{2+}$ |  |  |  |  |  |  |  |  |
| Total |  | 100.0 | 100.0 | 100.0 | 100.0 | 100.0 | 100.0 | 100.0 | 100.0 |
| $Mg^{2+} + Ca^{2+} + Sr^{2+}$ |  | 2.0 | 1.0 | 3.0 |  |  |  | 2.5 |  |
| $Al^{3+}/(Mg^{2+} + Ca^{2+} + Sr^{2+})$ |  | 5.0 | 10.0 | 3.3 |  |  |  | 3.0 |  |
| $Li^+ + Na^+ + K^+$ |  | 2.0 | 3.0 | 1.0 |  |  |  |  |  |
| $La^{3+} + Gd^{3+} + Y^{3+}$ |  |  |  |  |  |  |  | 1.5 |  |
| $Ba^{2+} + Zn^{2+}$ |  |  |  |  |  |  |  |  |  |
| $Al^{3+}/Si^{4+}$ |  | 1.00 | 1.00 | 1.00 | 0.90 | 4.00 | 0.70 | 1.00 | 1.00 |
| SG |  | 6.613 | 6.625 | 6.653 | 6.86 | 6.98 | 6.91 | 6.68 | 6.44 |
| LT | (° C.) | ≦730 | ≦730 | ≦730 | ≦730 | ≦730 | ≦800 | ≦730 | ≦750 |
| Tg | (° C.) | 395 | 389 | 397 | 398 | 379 | 394 | 407 | 416 |
| nd |  | 2.08208 | 2.08295 | 2.08122 | 2.1228 | 2.1399 | 2.1484 | 2.1004 | 2.0517 |
| νd |  | 17.43 | 17.42 | 17.44 | 16.7 | 16.5 | 16.3 | 17.4 | 19.1 |
| LV | (dPa · S) |  |  |  |  |  |  |  |  |
| Coloring | λ 70 (nm) | 483 | 487 | 488 | 505 | 512 | 499 | 487 | 480 |
| degree | λ 5 (nm) | 422 | 422 | 423 | 426 | 428 | 426 | 423 | 408 |
| Haze | Max. v |  | 1.2 | 0.5 | 0.5 | 0.9 |  | 0.7 |  |
| value | Min. v |  | 0.5 | 0.5 | 0.3 | 0.5 |  | 0.4 |  |
| Note |  | Haze value measured using dense barium crown type glass (HOYA: M-BACD5N, haze value 8-9) as a reference. | | | | | | | |

SG: Specific gravity
LT: Liquidus temperature
Tg: Glass transition temperature
nd: Refractive index
νd: Abbe's number
LV: Liquidus viscosity
Max. v: Maximum value
Min. v: Minimum value

TABLE 5

|  |  | Example No. | | | | | | | |
|---|---|---|---|---|---|---|---|---|---|
|  |  | 33 | 34 | 35 | 36 | 37 | 38 | 39 | 40 |
| Compo- | $B^{3+}$ | 40.0 | 37.1 | 37.5 | 37.5 | 35.0 | 35.0 | 37.5 | 37.5 |
| nent | $Si^{4+}$ | 2.5 | 5.0 | 2.5 | 5.0 | 5.0 | 5.0 | 7.5 | 7.5 |
| (cat %) | $Al^{3+}$ | 2.5 | 5.0 | 5.0 | 2.5 | 5.0 | 5.0 | 5.0 | 5.0 |
|  | $Bi^{3+}$ | 55.0 | 49.4 | 55.0 | 55.0 | 55.0 | 50.0 | 50.0 | 50.0 |
|  | $Li^+$ |  |  |  |  |  | 2.0 |  |  |
|  | $Na^+$ |  |  |  |  |  |  |  |  |
|  | $K^+$ |  |  |  |  |  |  |  |  |
|  | $Mg^{2+}$ |  |  |  |  |  |  |  |  |
|  | $Ca^{2+}$ |  | 1.0 |  |  |  | 1.0 |  |  |
|  | $Sr^{2+}$ |  |  |  |  |  |  |  |  |
|  | $La^{3+}$ |  | 2.5 |  |  |  | 1.0 |  |  |
|  | $Gd^{3+}$ |  |  |  |  |  |  |  |  |
|  | $Y^{3+}$ |  |  |  |  |  |  |  |  |
|  | $W^{6+}$ |  |  |  |  |  |  |  |  |
|  | $Ta^{5+}$ |  |  |  |  |  |  |  |  |
|  | $Nb^{5+}$ |  |  |  |  |  |  |  |  |
|  | $Zr^{4+}$ |  |  |  |  |  |  |  |  |
|  | $Ti^{4+}$ |  |  |  |  |  | 1.0 |  |  |
|  | $Sb^{3+}$ | 400 ppm | 400 ppm | 400 ppm | 400 ppm | 400 ppm | 400 ppm | 400 ppm | 400 ppm |
|  | $Ge^{4+}$ |  |  |  |  |  |  |  |  |
|  | $Sn^{4+}$ |  |  |  |  |  |  |  |  |
|  | $Ce^{4+}$ |  |  |  |  |  |  |  |  |
|  | $Zn^{2+}$ |  |  |  |  |  |  |  |  |
|  | $Ba^{2+}$ |  |  |  |  |  |  |  |  |

TABLE 5-continued

| | | Example No. | | | | | | | |
|---|---|---|---|---|---|---|---|---|---|
| | | 33 | 34 | 35 | 36 | 37 | 38 | 39 | 40 |
| Total | | 100.0 | 100.0 | 100.0 | 100.0 | 100.0 | 100.0 | 100.0 | 100.0 |
| $Mg^{2+} + Ca^{2+} + Sr^{2+}$ | | | 1.0 | | | | 1.0 | | |
| $Al^{3+}/(Mg^{2+} + Ca^{2+} + Sr^{2+})$ | | | 5.0 | | | | 5.0 | | |
| $Li^+ + Na^+ + K^+$ | | | | | | | 2.0 | | |
| $La^{3+} + Gd^{3+} + Y^{3+}$ | | | 2.5 | | | | 1.0 | | |
| $Ba^{2+} + Zn^{2+}$ | | | | | | | | | |
| $Al^{3+}/Si^{4+}$ | | 1.00 | 1.00 | 2.00 | 0.50 | 1.00 | 1.00 | 0.67 | 0.67 |
| SG | | 7.12 | 6.77 | 7.08 | 7.09 | 7.03 | 6.73 | 6.69 | |
| LT | (° C.) | ≦730 | ≦730 | ≦730 | ≦730 | ≦730 | ≦730 | ≦730 | |
| Tg | (° C.) | 381 | 402 | 377 | 382 | 382 | 395 | 405 | |
| nd | | 2.1612 | 2.1038 | 2.1538 | 2.1530 | 2.1433 | 2.1080 | 2.0889 | |
| vd | | 16.5 | 17.8 | 16.5 | 16.7 | 16.7 | 14.4 | 18.0 | |
| LV | (dPa · S) | | | | | | | | |
| Coloring | λ 70 (nm) | 508 | 493 | 509 | 502 | 500 | 491 | 516 | 488 |
| degree | λ 5 (nm) | 425 | 420 | 426 | 424 | 423 | 421 | 416 | 414 |
| Haze | Max. v | 0.5 | 0.9 | 0.5 | 1.1 | 0.4 | | | |
| value | Min. v | 0.2 | 0.4 | 0.3 | 0.6 | 0.2 | | | |
| Note | | | | Haze value measured using dense barium type glass (HOYA: M-BACD5N, haze value 8-9) as a reference. | | | | | * |

SG: Specific gravity
LT: Liquidus temperature
Tg: Glass transition temperature
nd: Refractive index
vd: Abbe's number
LV: Liquidus viscosity
* The same composition as that in Example 39. Al(NO3)3 introduced
Max. v: Maximum value
Min. v: Minimum value As is clear from Tables 1 to 5, the optical glasses of Examples 1 to 40 have high-refractivity high-dispersion properties exemplified by a refractive index (nd) of 1.84 or more and an Abbe's number (vd) of 30 or less, low liquidus temperatures exemplified by a liquidus temperature of 800° C. or lower, low glass transition temperatures exemplified by a glass transition temperature of 500° C. or lower, the property of being little colored exemplified by a $\lambda_{70}$ of 590 nm or shorter, and chemical durability exemplified by a haze value of 10% or less.

Each of refined and homogenized molten glasses corresponding to the glass compositions of Examples 1 to 40 was caused to flow out at a constant flow rate from a pipe made of platinum that had been temperature-adjusted to a temperature region that permitted stable flowing, molten glass gobs having the masses of intended preforms were separated by a dropping or down-moving cutting method, molten glass gobs were received on receiving molds having a gas ejection outlet in the bottom each and shaped into precision press-molding preforms while they were floated by ejecting gas from the gas ejection outlet. The intervals of separating each molten glass were adjusted and set to give spherical preforms and flat-spherical preforms. In the thus-obtained glasses, there were found none of foreign matters such as platinum grains, striae and devitrification.

The preforms obtained by the above method were precision press-molded with a press apparatus to obtain spherical lenses in the following manner. A preform was set between a lower mold member and an upper mold member constituting a press mold, then, a nitrogen atmosphere was substituted for an atmosphere in which the press mold and the preform were set, the press mold and the preform were heated with a heater, the temperature inside the press mold was adjusted to a temperature at which the glass to be shaped would exhibit a viscosity of $10^8$ to $10^{10}$ dPa·s, and while this temperature was maintained, the upper mold member was pressed by moving a pressing rod downward to press the preform set in the press mold. The pressing was carried out at 8 MPa for 30 seconds. After the pressing, the pressure was removed, and a glass molded product was gradually cooled to a temperature at which the above glass viscosity was $10^{12}$ dPa·s or more in a state that it was in contact with the lower mold member and the upper mold member. Then, the glass molded product was rapidly cooled to room temperature and taken out of the mold. In this manner, aspherical lenses having a convex meniscus form each were obtained.

Separately, preforms prepared from molten glasses having the glass compositions of Examples 1 to 40 in the same manner as in the above method were precision press-molded by another method different from the above-described method. In this method, first, while a preform was floated, it was pre-heated to a temperature at which the glass constituting the preform would have a viscosity of $10^8$ dPa·s. Separately, a press mold having an upper mold member, a lower mold member and a sleeve was heated to a temperature at which the above glass constituting the preform would exhibit a viscosity of $10^9$ to $10^{12}$ dPa·s, and the above-pre-heated preform was introduced into the cavity of the press mold and precision press-molded at 10 MPa. Simultaneously with the start of the pressing, the cooling of the glass and the press mold was started, they were cooled until a molded glass would have a viscosity of $10^{12}$ dPa·s or more, and a molded product was taken out of the mold. In this manner, aspherical lenses having a convex meniscus form each were obtained. The thus-obtained aspherical lenses had remarkably high surface accuracy.

An anti-reflection film was formed on each of the above aspherical lenses of two types obtained by the precision press-molding.

In the above manner, optical elements formed of high-refractivity glasses having high internal quality could be highly productively and highly precisely obtained.

These optical elements are suitable for a digital still camera, a digital video camera, a camera mounted on a cellphone, etc.

Comparative Examples 1-6

Optical glasses described in Examples of JP2002-201039A, JP2006-327926A and JP2007-70156A in Background Art were prepared, and measured for various properties in the same manner as in the measurements of the optical glasses of Examples 1 to 4. Table 6 shows the results.

The glasses of Comparative Examples 1 and 2 correspond to the glasses of Examples 9 and 27 of JP2006-327926A, the glasses of Comparative Examples 3, 4 and 5 correspond to the glasses of Examples 3, 5 and 6 of JP2002-201039A, and the glass of Comparative Example 6 correspond to the glass of Example 6 of JP2007-70156A.

TABLE 6

|  |  | CEx. 1 | CEx. 2 | CEx. 3 | CEx. 4 | CEx. 5 | CEx. 6 |
|---|---|---|---|---|---|---|---|
| Component (cat %) | $B^{3+}$ | 30.6 | 12.5 | 33.5 | 33.3 | 31.6 | 10.1 |
|  | $Si^{4+}$ | 5.9 | 6.3 |  | 12.6 | 11.7 | 10.0 |
|  | $Al^{3+}$ | 4.7 |  |  |  | 1.2 |  |
|  | $Bi^{3+}$ | 35.3 | 50.0 | 49.8 | 49.9 | 50.1 | 40.0 |
|  | $Li^+$ | 11.8 | 12.5 |  |  |  | 10.0 |
|  | $Na^+$ |  |  |  |  |  |  |
|  | $K^+$ |  |  |  |  |  |  |
|  | $Mg^{2+}$ |  |  |  |  |  |  |
|  | $Ca^{2+}$ |  | 6.3 |  |  |  | 10.0 |
|  | $Sr^{2+}$ |  |  |  |  |  |  |
|  | $La^{3+}$ |  |  |  |  |  |  |
|  | $Gd^{3+}$ |  |  |  |  |  |  |
|  | $Y^{3+}$ |  |  |  |  |  |  |
|  | $W^{6+}$ |  |  |  |  | 4.3 |  |
|  | $Ta^{5+}$ |  |  |  |  |  |  |
|  | $Nb^{5+}$ |  |  |  |  |  |  |
|  | $Zr^{4+}$ |  |  |  |  |  |  |
|  | $Ti^{4+}$ |  |  |  |  |  |  |
|  | $Sb^{3+}$ | 0.1 |  |  |  |  |  |
|  | $Ge^{4+}$ |  |  |  |  | 1.1 |  |
|  | $Sn^{4+}$ |  |  |  |  |  |  |
|  | $Ce^{4+}$ |  |  |  | 0.1 |  |  |
|  | $Zn^{2+}$ | 5.9 | 6.3 | 16.6 |  |  | 10.0 |
|  | $Ba^{2+}$ | 5.9 | 6.3 |  | 4.2 |  | 10.0 |
| Total |  | 100.0 | 100.0 | 100.0 | 100.0 | 100.0 | 100.0 |
| $Mg^{2+} + Ca^{2+} + Sr^{2+}$ |  |  | 6.3 |  |  |  | 10.0 |
| $Al^{3+}/(Mg^{2+} + Ca^{2+} + Sr^{2+})$ |  |  |  |  |  |  |  |
| $Li^+ + Na^+ + K^+$ |  | 11.8 | 12.5 |  |  |  | 10.0 |
| $La^{3+} + Gd^{3+} + Y^{3+}$ |  |  |  |  |  |  |  |
| $Ba^{2+} + Zn^{2+}$ |  | 11.8 | 12.5 | 16.6 | 4.2 |  | 20.0 |
| $Al^{3+}/Si^{4+}$ |  | 0.80 | — |  |  | 0.10 |  |
| SG |  | Devitrified after casting | Devitrified during casting | 7.16 | 6.75 | Devitrified during casting | 6.12 |
| LT | (° C.) |  |  | >800 | >800 |  | >800 |
| Tg | (° C.) |  |  | 364 | 403 |  | 386 |
| nd |  |  |  | 2.1707 | 2.0879 |  | 2.0175 |
| vd |  |  |  |  | 17.9 |  | 18.0 |
| LV | (dPa·S) |  |  |  |  |  |  |
| Coloring degree | λ 70 (nm) |  |  | 606 | 486 |  | 526 |
|  | λ 5 (nm) |  |  | 501 | 419 |  | 450 |
| Haze value | Max. v |  |  |  |  |  |  |
|  | Min. v |  |  |  |  |  |  |
| Note |  | JP2006-327926A No 9 | JP2006-327926A No 27 | JP2002-201039A No. 3 | JP2002-201039A No. 5 | JP2002-201039A No. 6 | JP2007-70156A No. 6 SiO2 crucible → Pt crucible |

CEx.: Comparative Example
SG: Specific gravity
LT: Liquidus temperature
Tg: Glass transition temperature
nd: Refractive index
vd: Abbe's number
Max. v: Maximum value
Min. v: Minimum value As is clear from Table 6, the composition of Comparative Example 1 contained $Ba^{2+}$ and $Zn^{2+}$ to excess in a total amount of 11.8 cationic % and hence lacked stability, and a crystal precipitated after a melt was cast.

The composition of Comparative Example 2 contained no $Al^{3+}$ but contained $Ba^{2+}$ and $Zn^{2+}$ to excess in a total amount of 12.6 cationic % and it hence lacked stability. While a melt was stirred, it caused the precipitation of a crystal and devitrified.

The glass of Comparative Example 3 contained none of $Si^{4+}$ and $Al^{3+}$ and contained $Zn^{2+}$ to excess in an amount of 16.6 cationic %, and it hence had low stability and had a liquidus temperature of over 800° C.

The glass of Comparative Example 4 contained no $Al^{3+}$, and it hence had low stability and had a liquidus temperature of over 800° C.

The composition of Comparative Example 5 had a cationic ratio of $Al^{3+}/Si^{4+}$ which was as small as 0.1, and it lacked stability. While a melt was stirred, it caused the precipitation of a crystal and devitrified.

The glass of Comparative Example 6 contained no $Al^{3+}$ but contained $Ba^{2+}$ and $Zn^{2+}$ to excess in a total amount of 20.0 cationic %. It hence had low stability and had a liquidus temperature of over 800° C.

FIG. 1 shows an enlarged photograph of a sample of Comparative Example 1, which was taken after casting. It is seen that crystals precipitated all over the entire sample.

BRIEF EXPLANATION OF DRAWINGS

FIG. 1 is a microscope photograph obtained by casting a composition of Comparative Example 1.

The invention claimed is:

1. An optical glass formed of an oxide glass devoid of $Ga^{3+}$ comprising, by cationic %, 30 to 70% of $Bi^{3+}$, 5 to 50% of $B^{3+}$, 0.5 to 50% of $Si^{4+}$, 1 to 20% of $Al^{3+}$, 0 to 20% of $Li^+$, 0 to 15% of $Na^+$, 0 to 10% of $K^+$, has, by cationic %, an $Li^+$, $Na^+$ and $K^+$ total content of 0 to 20% and a $Ba^{2+}$ and $Zn^{2+}$ total content of 0 to 10%, and, has an $Al^{3+}/Si^{4+}$ ratio of 0.2 or more by cationic ratio,
and having a liquidus temperature of 800° C. or lower.

2. The optical glass of claim 1, which has a $\lambda_{70}$ of 590 nm or shorter, the $\lambda_{70}$ being a wavelength at which the glass exhibits a spectral transmittance of 70%.

3. The optical glass of claim 1, which has a viscosity of 2 dPa·s or more at its liquidus temperature.

4. The optical glass of claim 1, wherein the total content of $Bi^{3+}$, $B^{3+}$, $Si^{4+}$ and $Al^{3+}$ by cationic % is 96% or more.

5. The optical glass of claim 1, which further comprises, by cationic %, 0.5 to 20% of $Ca^{2+}$, 0 to 15% of $Mg^{2+}$ and 0 to 10% of $Sr^{2+}$, has, by cationic %, a $Ca^{2+}$, $Mg^{2+}$ and $Sr^{2+}$ total content ($Ca^{2+}+Mg^{2+}+Sr^{2+}$) of 1 to 20% and has an $Al^{3+}/(Ca^{2+}+Mg^{2+}+Sr^{2+})$ ratio of from 0.2 to 20 by cationic ratio.

6. The optical glass of claim 1, which further comprises, by cationic %, 0 to 8% of $La^{3+}$, 0 to 8% of $Gd^{3+}$ and 0 to 8% of $Y^{3+}$ and has, by cationic %, an $La^{3+}$, $Gd^{3+}$ and $Y^{3+}$ total content of 0.1 to 8%.

7. The optical glass of claim 1, which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

8. The optical glass of claim 1, which has a refractive index (nd) of 1.84 or more and an Abbe's number (vd) of 30 or less.

9. The optical glass of claim 1, which has a glass transition temperature (Tg) of 500° C. or lower.

10. A precision press-molding preform formed of the optical glass recited in claim 1.

11. A process for the production of a precision press-molding preform, which comprises causing a molten glass obtained by melting glass raw materials to flow out, separating a molten glass gob from said molten glass and shaping said glass gob into the precision press-molding preform formed of the optical glass recited in claim 1 in the process of said glass gob being cooled to solidness.

12. An optical element formed of the optical glass recited in claim 1.

13. A process for the production of an optical element, which comprises heating the precision press-molding preform recited in claim 10 and precision press-molding the precision press-molding preform with a press mold.

14. The process for the production of an optical element as recited in claim 13, wherein the preform is introduced into the press mold, and the preform and the press mold are heated together to carry out the precision press-molding.

15. The process for the production of an optical element as recited in claim 13, wherein said preform is pre-heated and introduced into the press mold to carry out the precision press-molding.

16. An optical glass containing no $Ga^{3+}$, $In^{3+}$ or $Te^{4+}$ which comprises, by cationic %, 30 to 70% of $Bi^{3+}$, 5 to 50% of $B^{3+}$, 0.5 to 50% of $Si^{4+}$, 1 to 20% of $Al^{3+}$, 0.5 to 20% of $Ca^{2+}$, 0 to 15% of $Mg^{2+}$ and 0 to 10% of $Sr^{2+}$, has, by cationic %, a $Ca^{2+}$, $Mg^{2+}$ and $Sr^{2+}$ total content of 1 to 20% and a $Ba^{2+}$ and $Zn^{2+}$ total content of 0 to 10%, and has an $Al^{3+}/(Ca^{2+}+Mg^{2+}+Sr^{2+})$ ratio of from 0.2 to 20 by cationic ratio and an $Al^{3+}/Si^{4+}$ ratio of 0.2 or more by cationic ratio.

17. The optical glass of claim 16, which further comprises, by cationic %, 0 to 20% of $Li^+$, 0 to 15% of $Na^+$ and 0 to 10% of $K^+$ and has, by cationic %, an $Li^+$, $Na^+$ and $K^+$ total content of 0 to 20%.

18. The optical glass of claim 16, which further comprises, by cationic %, 0 to 8% of $La^{3+}$, 0 to 8% of $Gd^{3+}$ and 0 to 8% of $Y^{3+}$ and has, by cationic %, an $La^{3+}$, $Gd^{3+}$ and $Y^{3+}$ total content of 0.1 to 8%.

19. The optical glass of claim 16, which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

20. The optical glass of claim 16, which has a liquidus temperature of 800° C. or lower.

21. The optical glass of claim 16, which has a $\lambda_{70}$ of 590 nm or shorter, the $\lambda_{70}$ being a wavelength at which the glass exhibits a spectral transmittance of 70%.

22. The optical glass of claim 16, which has a viscosity of 2 dPa·s or more at its liquidus temperature.

23. The optical glass of claim 16, which has a refractive index (nd) of 1.84 or more and an Abbe's number (vd) of 30 or less.

24. The optical glass of claim 16, which has a glass transition temperature (Tg) of 500° C. or lower.

25. The optical glass of claim 24, which has a refractive index (nd) of 1.84 or more and an Abbe's number (vd) of 30 or less.

26. An optical glass containing no $Ga^{3+}$, $In^{3+}$ or $Te^{4+}$ which comprises, by cationic %, 30 to 70% of $Bi^{3+}$, 5 to 50% of $B^{3+}$, 0.5 to 50% of $Si^{4+}$, 1 to 20% of $Al^{3+}$, 0 to 20% of $Li^+$, 0 to 15% of $Na^+$, 0 to 10% of $K^+$, has, by cationic %, an $Li^+$, $Na^+$ and $K^+$ total content of 0 to 20% and a $Ba^{2+}$ and $Zn^{2+}$ total content of 0 to 10% and has an $Al^{3+}/Si^{4+}$ ratio of 0.2 or more by cationic ratio.

27. The optical glass of claim 26, which further comprises, by cationic %, 0 to 8% of $La^{3+}$, 0 to 8% of $Gd^{3+}$ and 0 to 8% of $Y^{3+}$ and has, by cationic %, an $La^{30}$, $Gd^{3+}$ and $Y^{3+}$ total content of 0.1 to 8%.

28. The optical glass of claim 26, which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

29. The optical glass of claim 26, which has a liquidus temperature of 800° C. or lower.

30. The optical glass of claim 26, which has a $\lambda_{70}$ of 590 nm or shorter, the $\lambda_{70}$ being a wavelength at which the glass exhibits a spectral transmittance of 70%.

31. The optical glass of claim 26, which has a viscosity of 2 dPa·s or more at its liquidus temperature.

32. The optical glass of claim 26, which has a refractive index (nd) of 1.84 or more and an Abbe's number (vd) of 30 or less.

33. The optical glass of claim 26, which has a glass transition temperature (Tg) of 500° C. or lower.

34. An optical glass containing no $Ga^{3+}$ or $Te^{4+}$ and comprising, by cationic %, 30 to 70% of $Bi^{3+}$, 5 to 50% of $B^{3+}$, 0.5 to 50% of $Si^{4+}$, 1 to 20%2.5% or more of $Al^{3+}$ and has, by cationic %, a $Bi^{3+}$, $B^{3+}$, $Si^{4+}$ and $Al^{3+}$ total content of 96% or more.

35. The optical glass of claim 34, which has a liquidus temperature of 800° C. or lower.

36. The optical glass of claim 34, which has a $\lambda_{70}$ of 590 nm or shorter, the $\lambda_{70}$ being a wavelength at which the glass exhibits a spectral transmittance of 70%.

37. The optical glass of claim 34, which has a viscosity of 2 dPa·s or more at its liquidus temperature.

38. The optical glass of claim 34, which has a glass transition temperature (Tg) of 500° C. or lower.

39. An optical glass formed of an oxide glass devoid of $Ga^{3+}$ and comprising, by cationic %, 30 to 70% of $Bi^{3+}$, 5 to 50% of $B^{3+}$, 0.5 to 50% of $Si^{4+}$, 2.5 to 20% of $Al^{3+}$ and a $Ba^{2+}$ and $Zn^{2+}$ total content of 0 to 10% and having a liquidus temperature of 800° C. or lower.

40. The optical glass of claim 39, which has a $\lambda_{70}$ of 590 nm or shorter, the $\lambda_{70}$ being a wavelength at which the glass exhibits a spectral transmittance of 70%.

41. The optical glass of claim 39, which has a viscosity of 2 dPa·s or more at its liquidus temperature.

42. The optical glass of claim 39, wherein the total content of $Bi^{3+}$, $B^{3+}$, $Si^{4+}$ and $Al^{3+}$ by cationic % is 96% or more.

43. The optical glass of claim 39, which further comprises, by cationic %, 0.5 to 20% of $Ca^{2+}$, 0 to 15% of $Mg^{2+}$ and 0 to 10% of $Sr^{2+}$, has, by cationic %, a $Ca^{2+}$, $Mg^{2+}$ and $Sr^{2+}$ total content ($Ca^{2+}+Mg^{2+}+Sr^{2+}$) of 1 to 20% and has an $Al^{3+}/(Ca^{2+}+Mg^{2+}+Sr^{2+})$ ratio of from 0.2 to 20 by cationic ratio.

44. The optical glass of claim 39, which further comprises, by cationic %, 0 to 20% of $Li^+$, 0 to 15% of $Na^+$, 0 to 10% of $K^+$, has, by cationic %, an $Li^+$, $Na^+$ and $K^+$ total content of 0 to 20% and a $Ba^{2+}$ and $Zn^{2+}$ total content of 0 to 10% and has an $Al^{3+}/Si^{4+}$ ratio of 0.2 or more by cationic ratio.

45. The optical glass of claim 39, which further comprises, by cationic %, 0 to 8% of $La^{3+}$, 0 to 8% of $Gd^{3+}$ and 0 to 8% of $Y^{3+}$ and has, by cationic %, an $La^{3+}$, $Gd^{3+}$ and $Y^{3+}$ total content of 0.1 to 8%.

46. The optical glass of claim 39, which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

47. The optical glass of claim 39, which has a refractive index (nd) of 1.84 or more and an Abbe's number (vd) of 30 or less.

48. The optical glass of claim 39, which has a glass transition temperature (Tg) of 500° C. or lower.

49. An optical glass containing no $Ga^{3+}$, $In^{3+}$ or $Te^{4+}$ which comprises, by cationic %, 30 to 70% of $Bi^{3+}$, 5 to 50% of $B^{3+}$, 0.5 to 50% of $Si^{4+}$, 2.5% or more of $Al^{3+}$, 0.5 to 20% of $Ca^{2+}$, 0 to 15% of $Mg^{2+}$ and 0 to 10% of $Sr^{2+}$, has, by cationic %, a $Ca^{2+}$, $Mg^{2+}$ and $Sr^{2+}$ total content of 1 to 20% and has an $Al^{3+}/(Ca^{2+}+Mg^{2+}+Sr^{2+})$ ratio of from 0.2 to 20 by cationic ratio and a total content of $Ba^{2+}$ and $Zn^{2+}$ of 0 to 10%.

50. The optical glass of claim 49, which further comprises, by cationic %, 0 to 20% of $Li^+$, 0 to 15% of $Na^+$ and 0 to 10% of $K^+$ and has, by cationic %, an $Li^+$, $Na^+$ and $K^+$ total content of 0 to 20%.

51. The optical glass of claim 49, which further comprises, by cationic %, 0 to 8% of $La^{3+}$, 0 to 8% of $Gd^{3+}$ and 0 to 8% of $Y^{3+}$ and has, by cationic %, an $La^{3+}$, $Gd^{3+}$ and $Y^{3+}$ total content of 0.1 to 8%.

52. The optical glass of claim 49, which further comprises, by cationic %, 0 to 8% of $W^{6+}$, 0 to 5% of $Ta^{5+}$, 0 to 8% of $Nb^{5+}$, 0 to 8% of $Zr^{4+}$ and 0 to 10% of $Ti^{4+}$.

53. The optical glass of claim 49, which has a liquidus temperature of 800° C. or lower.

54. The optical glass of claim 49, which has a $\lambda_{70}$ of 590 nm or shorter, the $\lambda_{70}$ being a wavelength at which the glass exhibits a spectral transmittance of 70%.

55. The optical glass of claim 49, which has a viscosity of 2 dPa·s or more at its liquidus temperature.

56. The optical glass of claim 49, which has a refractive index (nd) of 1.84 or more and an Abbe's number (vd) of 30 or less.

57. The optical glass of claim 49, which has a glass transition temperature (Tg) of 500° C. or lower.

\* \* \* \* \*